United States Patent
Yamamoto et al.

(10) Patent No.: US 10,406,903 B2
(45) Date of Patent: Sep. 10, 2019

(54) VEHICLE

(71) Applicant: YAMAHA MOTOR POWER PRODUCTS KABUSHIKI KAISHA, Kakegawa-shi, Shizuoka (JP)

(72) Inventors: Keisuke Yamamoto, Shizuoka (JP); Yoshio Ataka, Shizuoka (JP); Takeshi Ito, Shizuoka (JP); Yoshiki Tonooka, Shizuoka (JP)

(73) Assignee: YAMAHA MOTOR POWER PRODUCTS KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/092,367

(22) PCT Filed: Jun. 1, 2017

(86) PCT No.: PCT/JP2017/020505
§ 371 (c)(1),
(2) Date: Oct. 9, 2018

(87) PCT Pub. No.: WO2018/008304
PCT Pub. Date: Jan. 11, 2018

(65) Prior Publication Data
US 2019/0118631 A1    Apr. 25, 2019

(30) Foreign Application Priority Data

Jul. 8, 2016 (JP) .................................. 2016-136455

(51) Int. Cl.
*B60K 5/00* (2006.01)
*B60K 11/04* (2006.01)
(Continued)

(52) U.S. Cl.
CPC ................. *B60K 5/00* (2013.01); *B60K 11/04* (2013.01); *B62D 25/20* (2013.01); *F02M 35/10* (2013.01);
(Continued)

(58) Field of Classification Search
CPC .......... B60K 5/00; B60K 11/04; B62D 25/20; F02M 35/10; F02M 35/16
See application file for complete search history.

(56) References Cited

U.S. PATENT DOCUMENTS 7,874,605 B2 *    1/2011 Smith .................... B60N 2/005
                                                                  296/64
8,132,827 B2 *    3/2012 Bergman ............... B60N 3/023
                                                                  280/748

(Continued)

FOREIGN PATENT DOCUMENTS

JP    04-356225 A    12/1992
JP    08-268087 A    10/1996
(Continued)

OTHER PUBLICATIONS

Official Communication issued in International Patent Application No. PCT/JP2017/020505, dated Jul. 18, 2017.
(Continued)

*Primary Examiner* — Bryan A Evans
(74) *Attorney, Agent, or Firm* — Keating and Bennett, LLP

(57) ABSTRACT

A golf car includes a floor panel between front wheels and rear wheels. The floor panel includes first and second panels. An opening is provided in the second panel. A groove communicates with the opening, and is continuous from the second panel to the first panel. The groove is covered by a lid. External air from the groove is supplied by a fan into a shroud which covers a cylinder body and also into a muffler (Continued)

cover which covers a muffler. External air from an air intake duct, which faces the groove, is cleaned by an air cleaner and then supplied into the engine.

9 Claims, 22 Drawing Sheets

(51) Int. Cl.
*B62D 25/20* (2006.01)
*F02M 35/16* (2006.01)
*F02M 35/10* (2006.01)

(52) U.S. Cl.
CPC ......... *F02M 35/16* (2013.01); *B60G 2300/26* (2013.01); *B60K 2005/003* (2013.01)

(56) References Cited

U.S. PATENT DOCUMENTS

| | | | | |
|---|---|---|---|---|
| 8,544,582 B2 * | 10/2013 | Kaku | ................. | B60K 13/04 180/309 |
| 8,567,847 B1 * | 10/2013 | King | ................. | B60K 13/02 180/68.3 |
| 8,960,348 B2 * | 2/2015 | Shomura | ................. | F02M 35/162 180/68.3 |
| 2008/0289896 A1 * | 11/2008 | Kosuge | ................. | B60K 11/06 180/312 |

FOREIGN PATENT DOCUMENTS

| | | |
|---|---|---|
| JP | 2001-310769 A | 11/2001 |
| JP | 2008-044551 A | 2/2008 |
| JP | 2015-101162 A | 6/2015 |

OTHER PUBLICATIONS

Nagai et al., "Vehicle", U.S. Appl. No. 16/092,368, filed Oct. 9, 2018.

Oba et al., "Vehicle", U.S. Appl. No. 16/092,370, filed Oct. 9, 2018.

* cited by examiner

VEHICLE

BACKGROUND OF THE INVENTION

1. Field of the Invention

The present invention relates to vehicles, and more specifically to a vehicle including an engine.

2. Description of the Related Art

JP-A 2008-44551 and JP-A H8-268087 disclose examples of a conventional technique in this field.

JP-A 2008-44551 discloses an off-road four-wheel vehicle engine-room cooling structure, wherein the off-road four-wheel vehicle includes a cabin, which houses an operation section and a seat, between a left-and-right pair of front wheels and a left-and-right pair of rear wheels; and an engine room inside the cabin or at a location more rearward than the cabin. The engine room covers at least ahead and above the engine. The disclosed engine room cooling structure includes an air duct which extends forward from the engine room to introduce engine room cooling air into the engine room. The air duct is routed under a floor plate, and an under guard is provided at least below a rear portion of the air duct.

JP-A H8-268087 discloses an engine room ventilation structure, wherein a vehicle has an engine room under a front floor; the vehicle has a storage room at its front end portion, where a spare tire carrier is disposed; and the spare tire carrier is hollow to form an air path from a front surface of the vehicle to the engine room. The air path is routed under the front floor; an exit of the air path is located under the front floor; and an undercover is provided at least below the exit of the air path.

As described in JP-A 2008-44551, an air duct to introduce cooling air into the engine room and an under guard to protect the air duct are provided separately. Likewise, in JP-A H8-268087, an air path to the engine room and an undercover to protect the air path are provided separately. Either case requires an increased number of parts.

SUMMARY OF THE INVENTION

Preferred embodiments of the present invention provide vehicles in which external air is introduced with a reduced number of parts.

According to a preferred embodiment of the present invention, a vehicle includes a front wheel; a rear wheel provided at a more rearward position than the front wheel; a floor panel provided between the front wheel and the rear wheel; an engine including a cylinder body and located rearward of the floor panel; and a shroud covering the cylinder body. In this vehicle, the floor panel includes a panel main body; an opening provided at a front portion of the panel main body; and a groove provided in an upper surface of the panel main body so as to communicate with the opening and extend in a fore-aft direction of the panel main body to supply external air from the opening to an interior of the shroud.

According to a preferred embodiment of the present invention, external air is introduced from the opening of the panel main body, flows through the groove which defines an external air introducing path, and is supplied into the shroud. In this structure, the opening and the groove are located in the panel main body of the floor panel. In other words, the floor panel itself includes an external air introducing path. Therefore, there is no need to prepare a separate external air introducing path provided by an individual member separate from the floor panel. Also, the groove is defined by providing the panel main body with a downward recess in its upper surface, in particular, so that the recess opens in the upper surface, and not in the lower surface. Since the floor panel itself protects members which are located thereabove, there is no need to provide protection members below the groove to protect the external air introducing path (the groove). Therefore, it is possible to introduce external air with a reduced number of parts.

Preferably, the panel main body includes a first panel extending in the fore-aft direction between the front wheel and the rear wheel; and a second panel located behind the front wheel and extending upward from a front end region of the first panel; the opening is located in the second panel; and the groove communicates with the opening and is continuous from the second panel to the first panel. By providing the opening in the second panel which extends upward, it is possible to efficiently introduce running wind as the external air from ahead of the vehicle into the groove.

Preferably, the vehicle further includes a lid which covers the groove. By covering the groove with the lid, it is possible to introduce the external air which flows through the groove more reliably toward the rear, thus supplying the air easily into the shroud.

Further, preferably, the groove includes a side surface and the opening is located in the side surface. In this case, since the opening is provided in the side surface of the groove, it is possible to reduce the entry of mud, sand, stones and other foreign matter into the opening and then into the groove when they fly from ahead of the vehicle into the front surface of the floor panel.

Preferably, the vehicle further includes a cover provided ahead of the opening. By providing the cover ahead of the opening, it is possible to further reduce the entry of mud, sand, stones and other foreign matter into the opening and then into the groove when they fly from ahead of the vehicle into the front surface of the floor panel.

Preferably, the vehicle further includes a fan that supplies the external air from the groove into the shroud. In this case, the external air from the groove is supplied into the shroud efficiently and smoothly by the fan.

Preferably, the vehicle further includes a muffler that receives exhaust gas from the engine; and a muffler cover which covers the muffler and communicates with the shroud, and with the above structure, the muffler is located adjacent to the engine. By positioning the muffler next to the engine, it is possible to shorten the length of an exhaust pipe which allows the exhaust gas to move from the engine to the muffler. Further, by connecting the muffler cover which covers the muffler to the shroud, the external air is able to also flow through the groove to the inside of the muffler cover. Therefore, it is possible to cool not only the engine but also the muffler.

Preferably, the groove also allows the external air to be supplied into the engine. In this case, the external air flows through the groove and is supplied not only into the shroud but also into the engine. Therefore, there is no need to separately provide an air intake path to supply air into the engine.

Further preferably, the vehicle further includes an air intake duct that faces the groove and introduces the external air from the groove; and an air cleaner provided between the air intake duct and the engine to clean the external air from the air intake duct before supplying the external air into the engine. By positioning the air intake duct to face the groove, the external air from the groove is introduced to the air cleaner efficiently via the air intake duct, and after being cleaned by the air cleaner, the external air is supplied smoothly into the engine.

According to preferred embodiments of the present invention, it is possible to introduce external air with a reduced number of parts.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a rear perspective view showing the frame, a floor panel, and so on.

FIG. 9 is a plan view showing the frame, the floor panel, and so on.

FIG. 15 is a side view (taken from left) showing the frame, the floor panel, and so on.

DETAILED DESCRIPTION OF THE PREFERRED EMBODIMENTS

Hereinafter, preferred embodiments of the present invention will be described with reference to the drawings. Herein, description will be made in which a preferred embodiment of the present invention is applied to a golf car 10 as an example of a vehicle. It is noted that the terms front and rear, right and left, up and down as used in the following description are determined from the golf car driver's position on a seat 18 of the golf car 10, with the driver facing toward a steering wheel 30.

Figure 1:
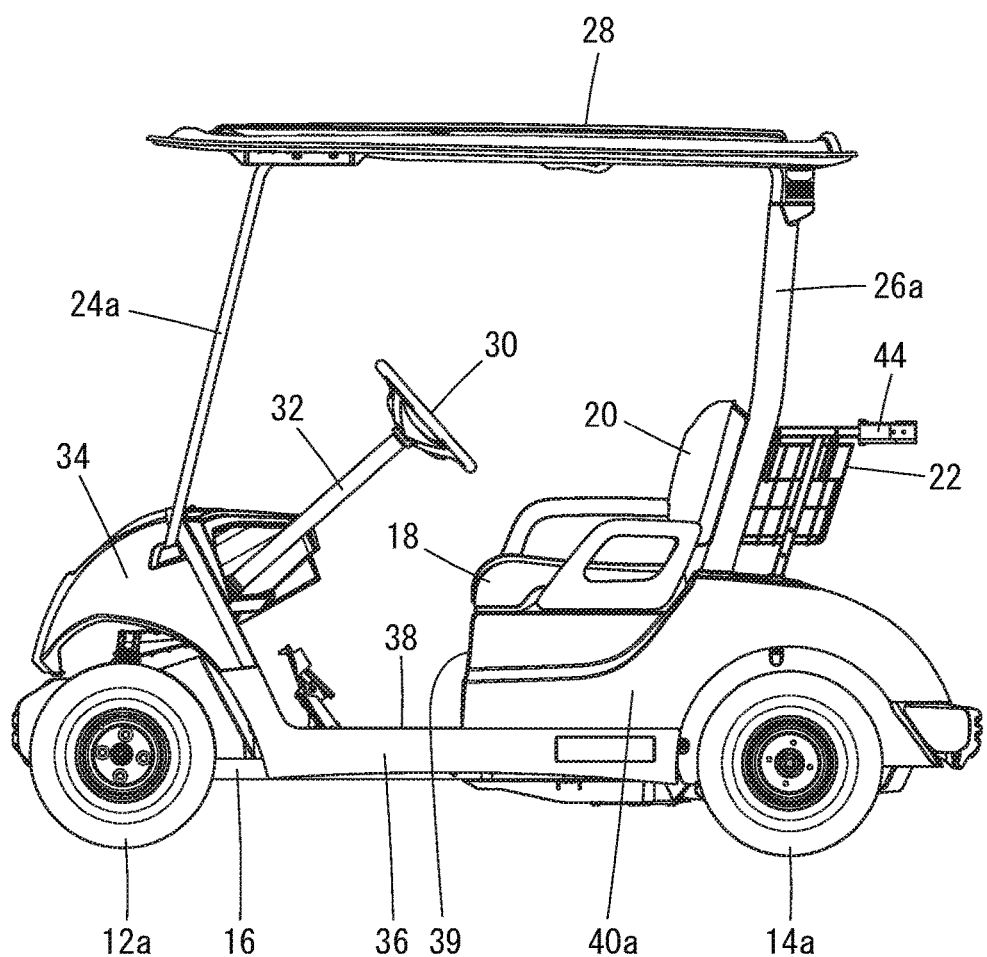
FIG. 1 is a side view (taken from left) showing a golf car according to a preferred embodiment of the present invention.
Figure 2:
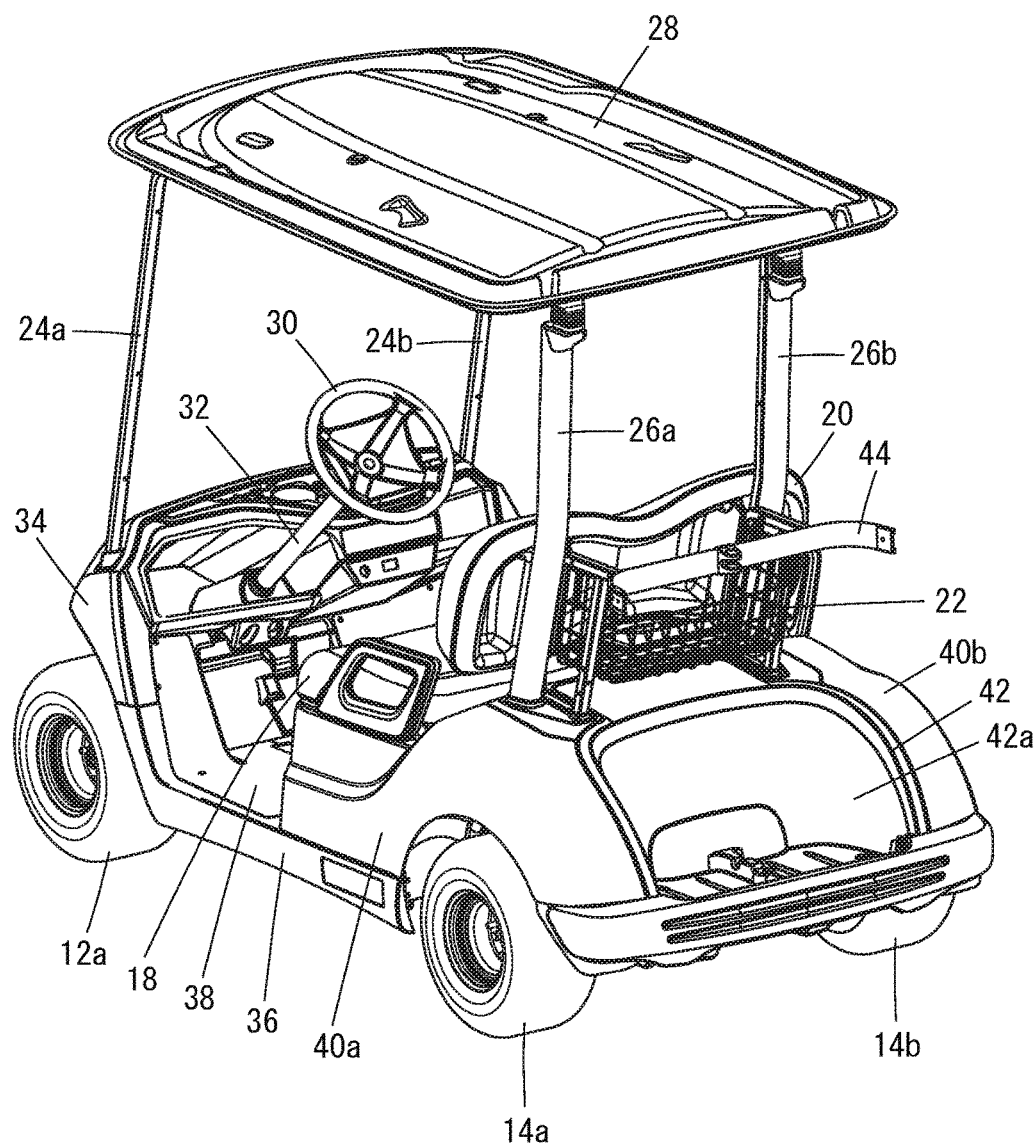
FIG. 2 is a rear perspective view showing the golf car according to a preferred embodiment of the present invention.
Figure 3:
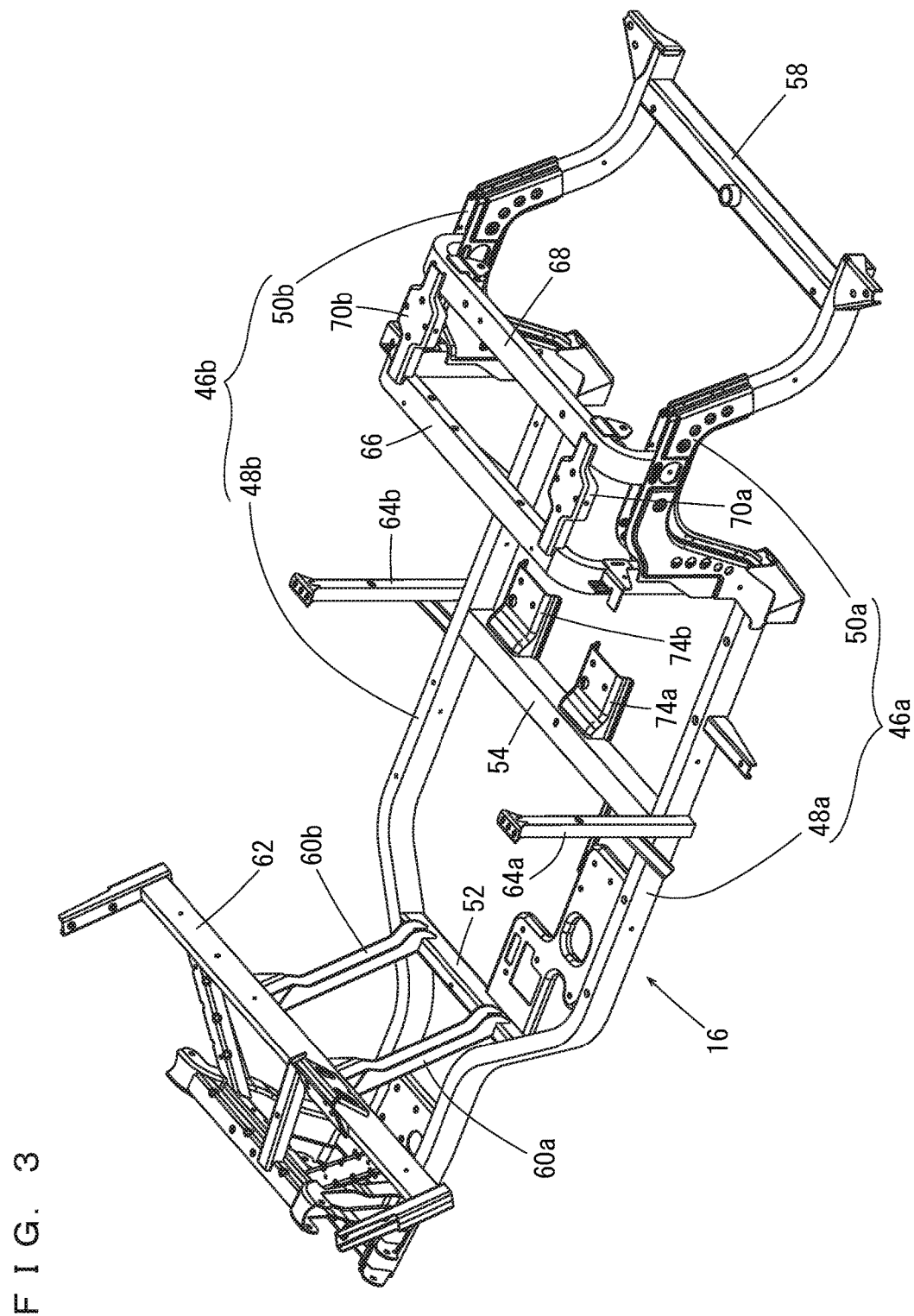
FIG. 3 is a rear perspective view showing primary portions of a frame.

Referring to FIG. 1 and FIG. 2, the golf car 10 is, for example a two-person golf car, and includes a pair of front wheels 12a, 12b (see FIG. 9), a pair of rear wheels 14a, 14b, and a frame 16. The pair of rear wheels 14a, 14b are located more rearward than the pair of front wheels 12a, 12b. The pair of front wheels 12a, 12b are supported rotatably at a front region of the frame 16. The pair of rear wheels 14a, 14b are supported rotatably at a rear region of the frame 16.

The seat 18 extends in a width direction of the golf car 10 at a more rearward position than the pair of front wheels 12a, 12b, but at a more forward position than the pair of rear wheels 14a, 14b. The seat 18 is supported by a seat rail 72 (which will be described below) of the frame 16. A seat back 20 is provided at an obliquely upward and rearward position of the seat 18. A basket 22 that accommodates baggage is provided behind the seat back 20. The seat back 20 and the basket 22 are supported by rear pillars 26a, 26b which will be described below.

A pair of front pillars 24a, 24b are provided at more forward positions than the seat 18, whereas a pair of rear pillars 26a, 26b are provided at more rearward positions than the seat 18. The front pillars 24a, 24b and the rear pillars 26a, 26b are supported by the frame 16 at their lower end portions. The front pillars 24a, 24b and the rear pillars 26a, 26b extend from below to above while tilting slightly rearward. A roof 28 covers from above the seat 18, and is supported by the front pillars 24a, 24b and the rear pillars 26a, 26b.

A steering wheel 30 is located ahead of the seat back 20. The steering wheel 30 is connected to the front wheels 12a, 12b via a steering shaft 32 and an unillustrated connection mechanism.

The frame 16 is covered with a cowl 34, a pair of side protectors 36, a floor panel 38, a body panel 39, a pair of rear fender covers 40a, 40b, and a rear floor cover 42, each made of a resin, for example. The cowl 34 covers the front region of the frame 16 and above the front wheels 12a, 12b. The pair of side protectors 36 cover an intermediate region of the frame 16 from two sides. The floor panel 38, which defines and functions as a footrest for the driver and the passenger sitting on the seat 18 to rest their feet, provides a bottom portion of a cabin space of the golf car 10. The body panel 39 covers a front region below the seat 18. The pair of rear fender covers 40a, 40b cover two sides below the seat 18 and above the pair of rear wheels 14a, 14b. The rear floor cover 42 is sandwiched by rear end portions of the pair of rear fender covers 40a, 40b, and includes a concave portion 42a to place golf bags, for example. Simply by removing the rear floor cover 42 only, it is possible to easily maintain a CVT (Continuously Variable Transmission) 144 (which will be described below) and a transmission 146 (which will be described below). At a position above the concave portion 42a and behind the basket 22, there is provided a holder 44 that holds the golf bags. The holder 44 is supported by connectors 70a, 70b (which will be described below).

Next, a structure of the frame 16 and its surroundings will be described.

Referring to FIG. 3 through FIG. 7, the frame 16 includes a pair of main frames 46a, 46b which are spaced apart from each other in a width direction of the vehicle and extend in a fore-aft direction of the vehicle; cross members 52, 54, 56, 58, and a pair of support frames 60a, 60b. The pair of main frames 46a, 46b respectively include front frames 48a, 48b extending in the fore-aft direction; and rear frames 50a, 50b extending rearward from rear end portions of the respective front frames 48a, 48b. The pair of front frames 48a, 48b are provided so that their front end portions are closer to each other than their rear end portions do. The pair of rear frames 50a, 50b are curved to project upward.

The front frames 48a, 48b are connected to each other by the cross members 52, 54. A portion where the front frame 48a and the rear frame 50a are joined to each other and a portion where the front frame 48b and the rear frame 50b are joined to each other are connected to each other by the cross member 56. The rear frames 50a, 50b have their rear end portions connected to each other by the cross member 58. In other words, the main frames 46a, 46b are connected to each other by the cross members 52, 54, 56, 58 which extend in the vehicle width direction. The cross members 52, 54, 56, 58 are spaced apart from each other in the vehicle fore-aft direction, and are disposed in this order from the front to the rear of the vehicle. The cross member 52 is joined to the pair of support frames 60a, 60b which extend obliquely forward.

The pair of support frames 60a, 60b have their front end portions support a cross member 62 which extends in the vehicle width direction. Near the cross member 54 in the pair of front frames 48a, 48b, a pair of support frames 64a, 64b which extend upward are joined. Also, the pair of rear frames 50a, 50b have their front portions connected to each other by a connection frame 66. The pair of rear frames 50a, 50b have their intermediate regions connected to each other by a connection frame 68. The connection frame 66 extends in the vehicle width direction, with its two end portions extending downward to define an upwardly projecting U-shape. The connection frame 68 extends in the vehicle width direction, with its two end portions extending downward to define an upwardly projecting U-shape. The connection frames 66 and 68 are spaced apart from each other in the vehicle fore-aft direction, and are connected to each other by the connectors 70a, 70b. Further, the pair of support frames 64a, 64b include their upper end portions; the connection frame 66 include two side portions; and these portions are connected to each other by the seat rail 72. The seat rail 72 is C-shaped or substantially C-shaped and extend in a horizontal direction. To the cross member 54, a pair of brackets 74a, 74b are attached side by side in the vehicle width direction.

Figure 4:
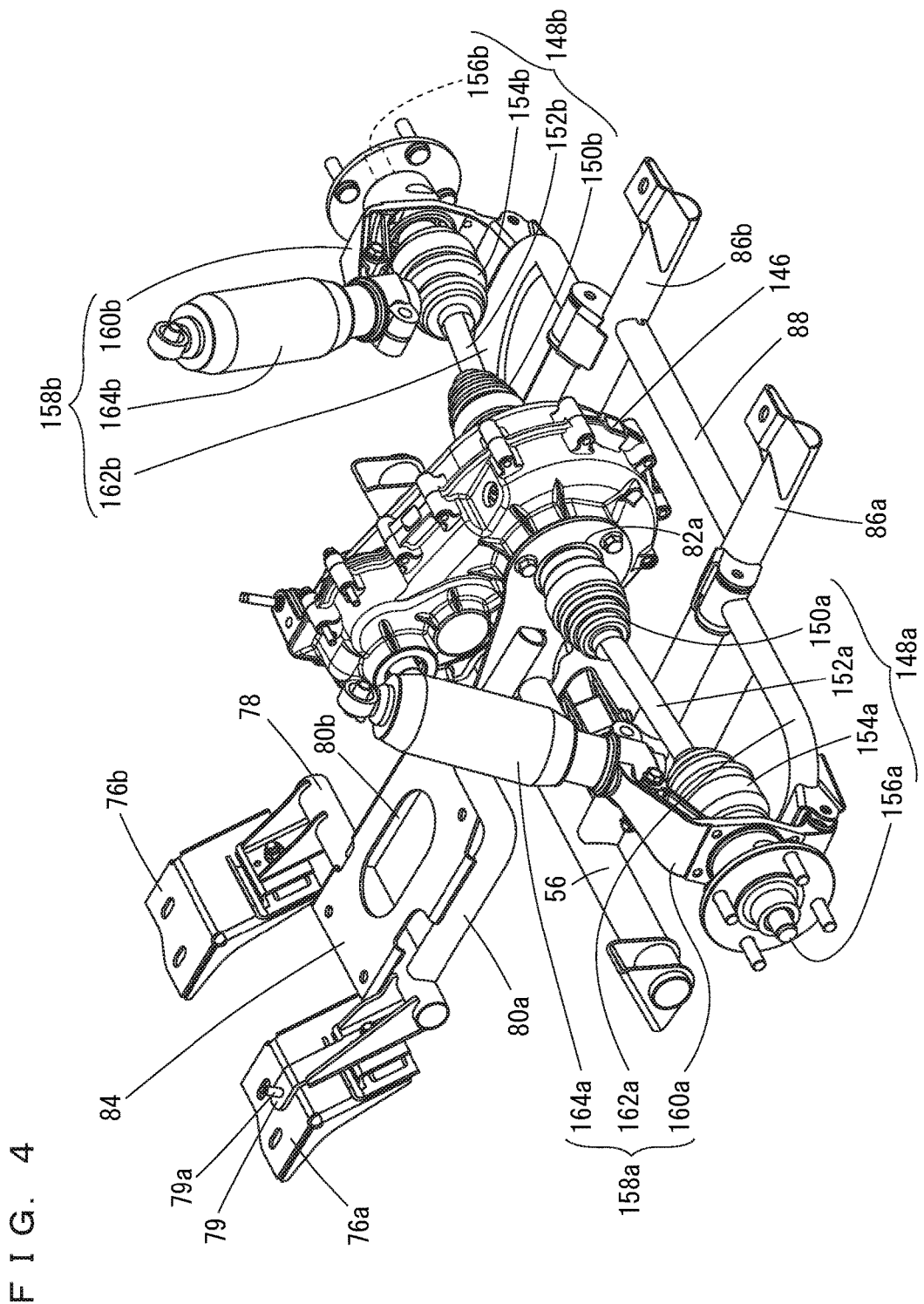
FIG. 4 is a rear perspective view showing a portion of the frame, a transmission, and their surroundings.
Figure 5:
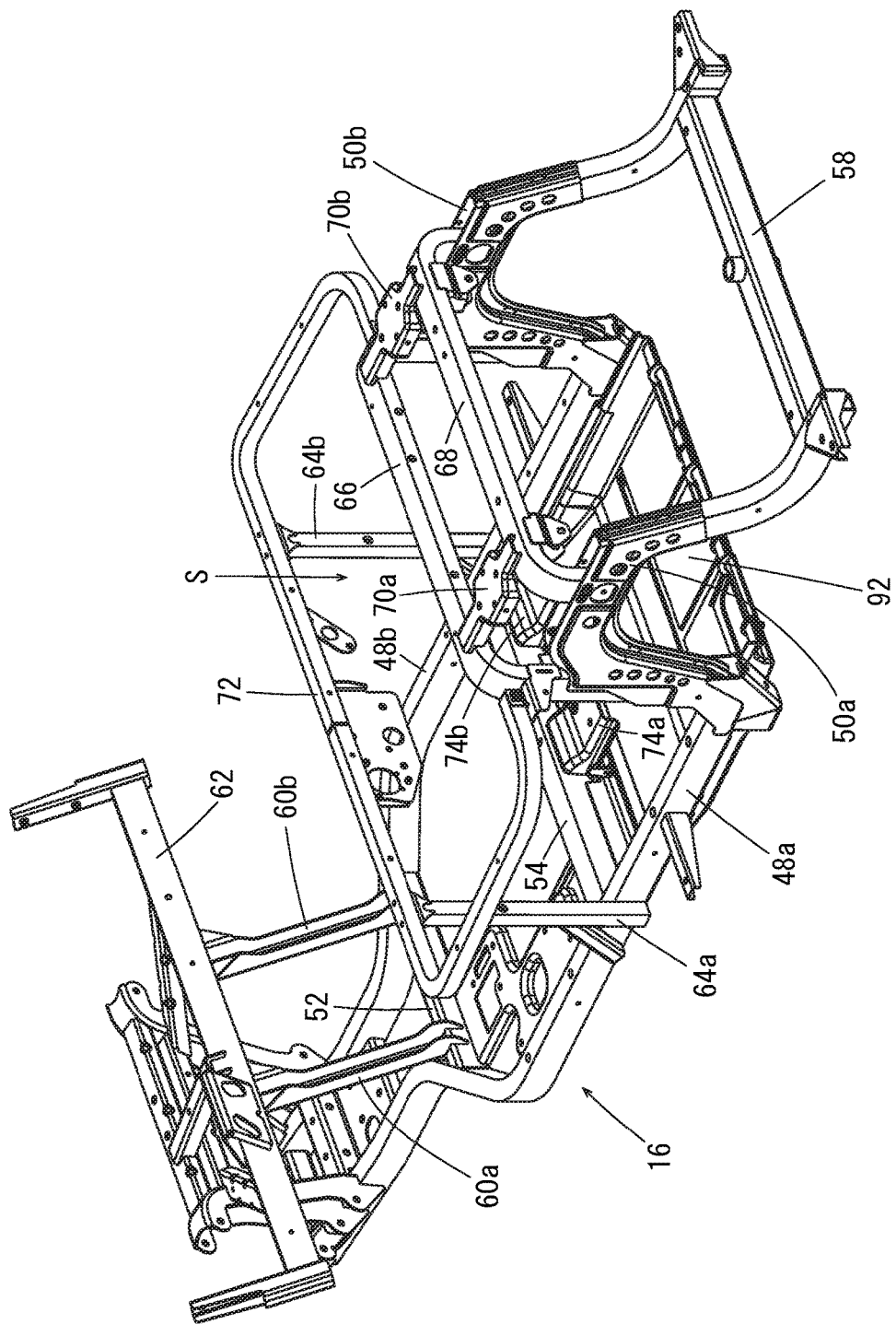
FIG. 5 is a rear perspective view showing primary portions of the frame and a front cover.

Referring to FIG. 4, a pair of engine brackets 76a, 76b are joined to the pair of brackets 74a, 74b. The engine brackets 76a, 76b are connected to each other via a cross member 78. The cross member 78 is joined to a support frame 79 which extends forward and support frames 80a, 80b which extend rearward. The support frame 79 includes a tip portion including a projection 79a. The support frames 80a, 80b have their respective rear end portions provided with through-holes 82a, 82b (see FIG. 8). On the cross member 78 and the support frames 80a, 80b, there is attached an engine bracket 84 to support an engine 114 (which will be described later). The cross member 78 is pivotably joined to the engine brackets 76a, 76b in an up-down direction. Accordingly, the engine bracket 84 is also pivotable in the up-down direction. The cross member 56 is joined to a pair of frames 86a, 86b which extend rearward. The pair of frames 86a, 86b are connected to each other at regions near their rear end portions by a cross member 88. The pair of frames 86a, 86b have their rear end portions joined to the cross member 58.

Figure 6:
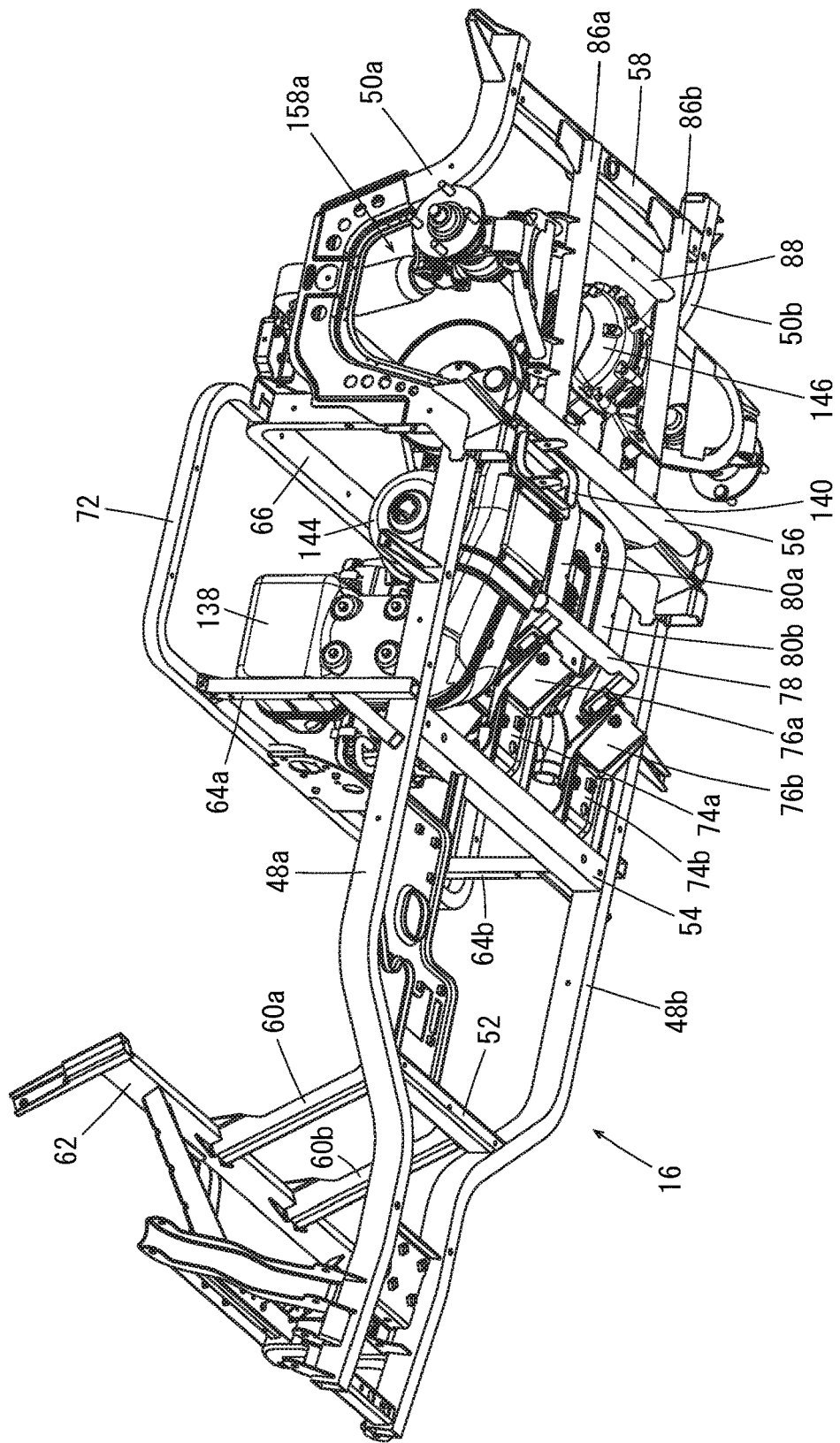
FIG. 6 is a perspective view showing the frame and its surroundings.
Figure 7:
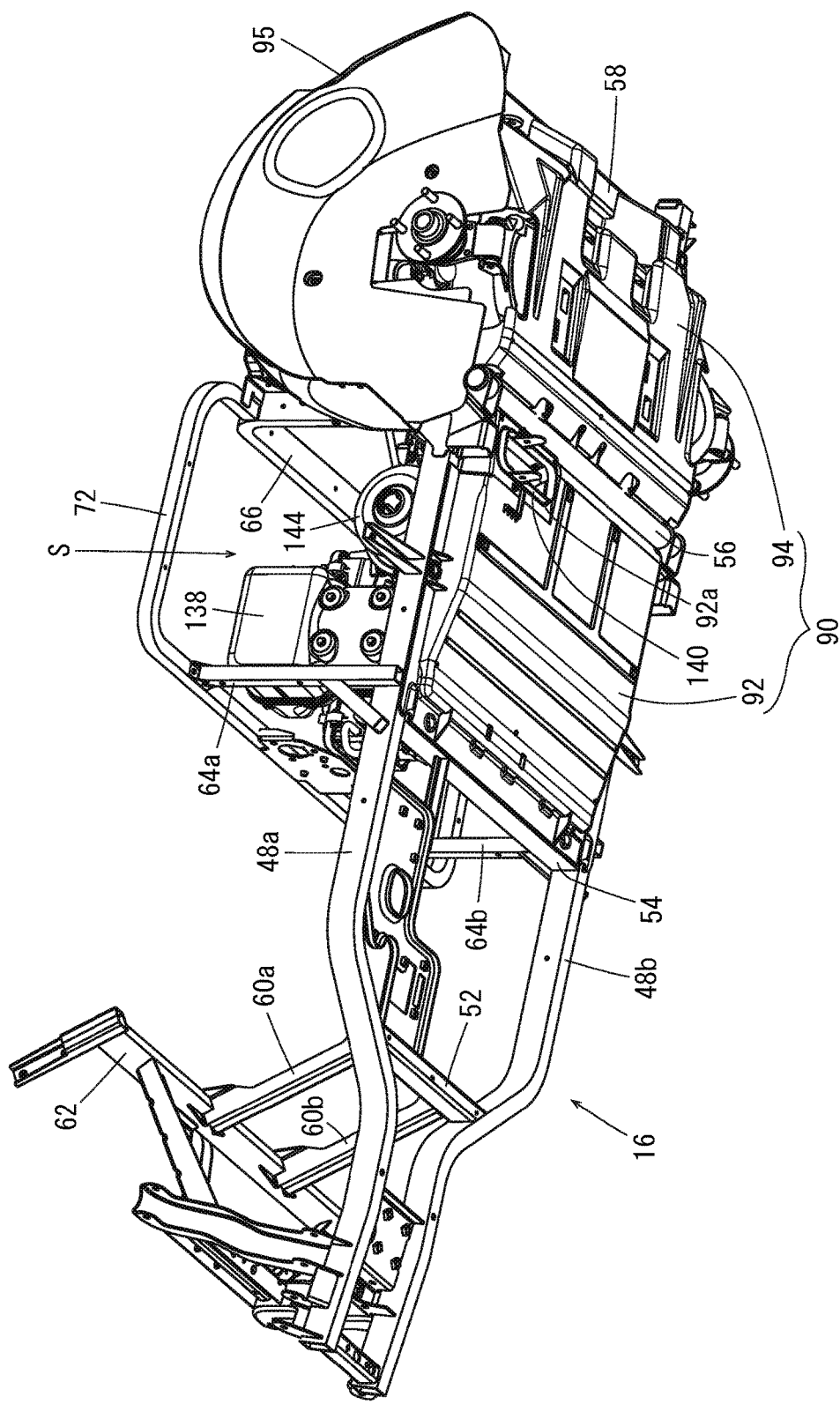
FIG. 7 is a perspective view showing the frame, an undercover, and their surroundings.

Referring to FIG. 6 and FIG. 7, the frame 16 supports an undercover 90. The undercover 90 includes a front cover 92 and a rear cover 94 respectively on its forward and rearward sides. The front cover 92 is located between the cross members 54 and 56, and is attached to the pair of front frames 48a and 48b, and to the cross members 54 and 56. The rear cover 94 is located between the cross members 56 and 58, and is attached to the cross members 56 and 88, the frames 86a, 86b, and the rear frames 50a, 50b. To the rear frames 50a, 50b, a pair of inner cowls 95 (the inner cowl on the right side is not shown) are attached respectively. The pair of inner cowls 95 are located between the rear wheels 14a, 14b and the rear fender covers 40a, 40b to cover above the respective rear wheels 14a, 14b.

The undercover 90, the seat 18, the body panel 39, a heat insulation board 176 (which will be described below), a fuel tank 168 (which will be described below), the left and the right inner cowls 95, and the rear floor cover 42 define a space as an engine room S. In other words, the engine room S is surrounded by the undercover 90, the seat 18, the body panel 39, the heat insulation board 176, the fuel tank 168, the left and the right inner cowls 95, and the rear floor cover 42. In other words, on an under side, an upper side, a front side, a left side, a right side, and a rear side of the engine room S, there are provided the undercover 90, the seat 18, the body panel 39, the heat insulation board 176 and the left inner cowl 95, the fuel tank 168 and the right inner cowl 95, and the rear floor cover 42, respectively.

Figure 8:
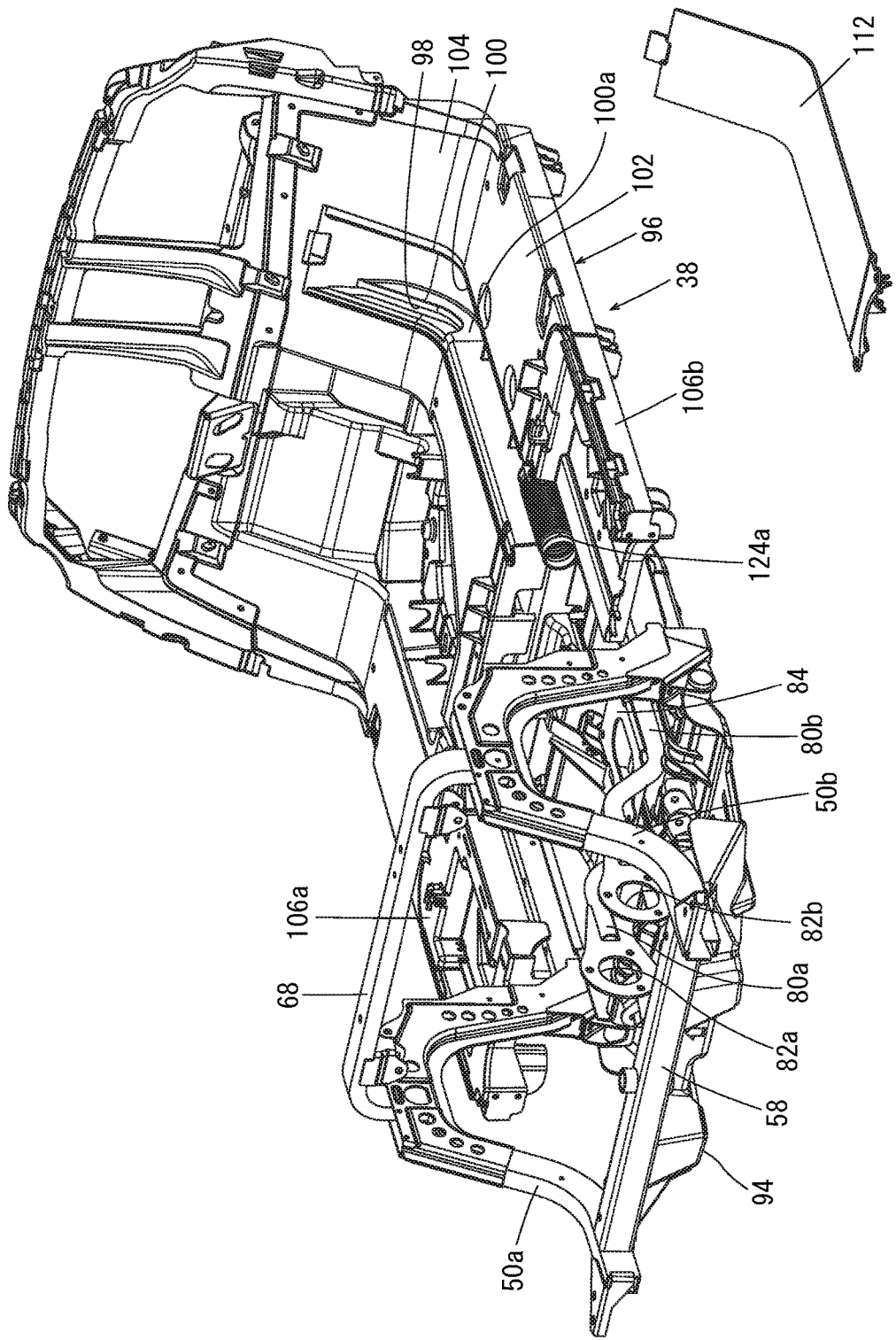
Figure 9:
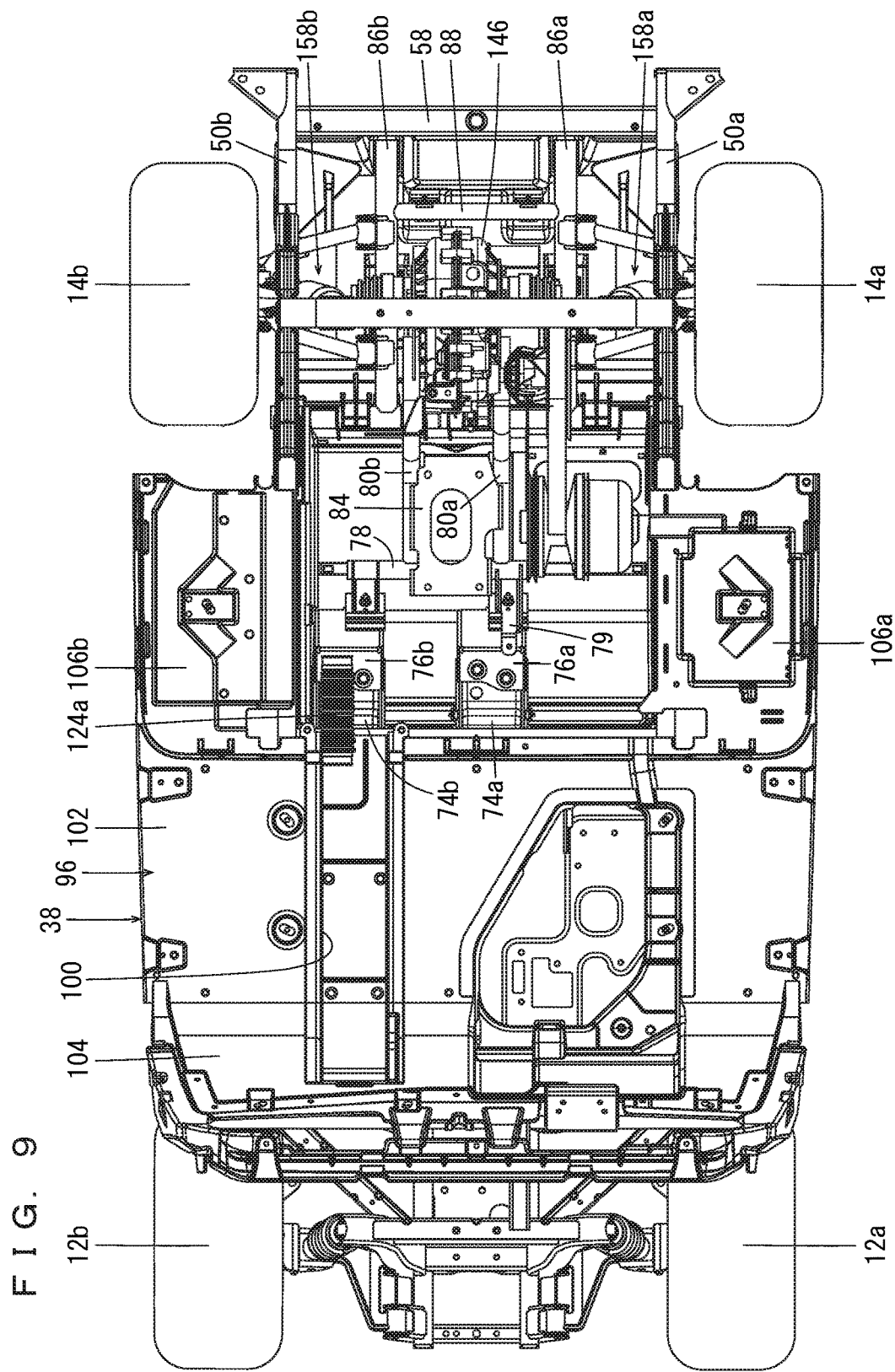
Figure 10:
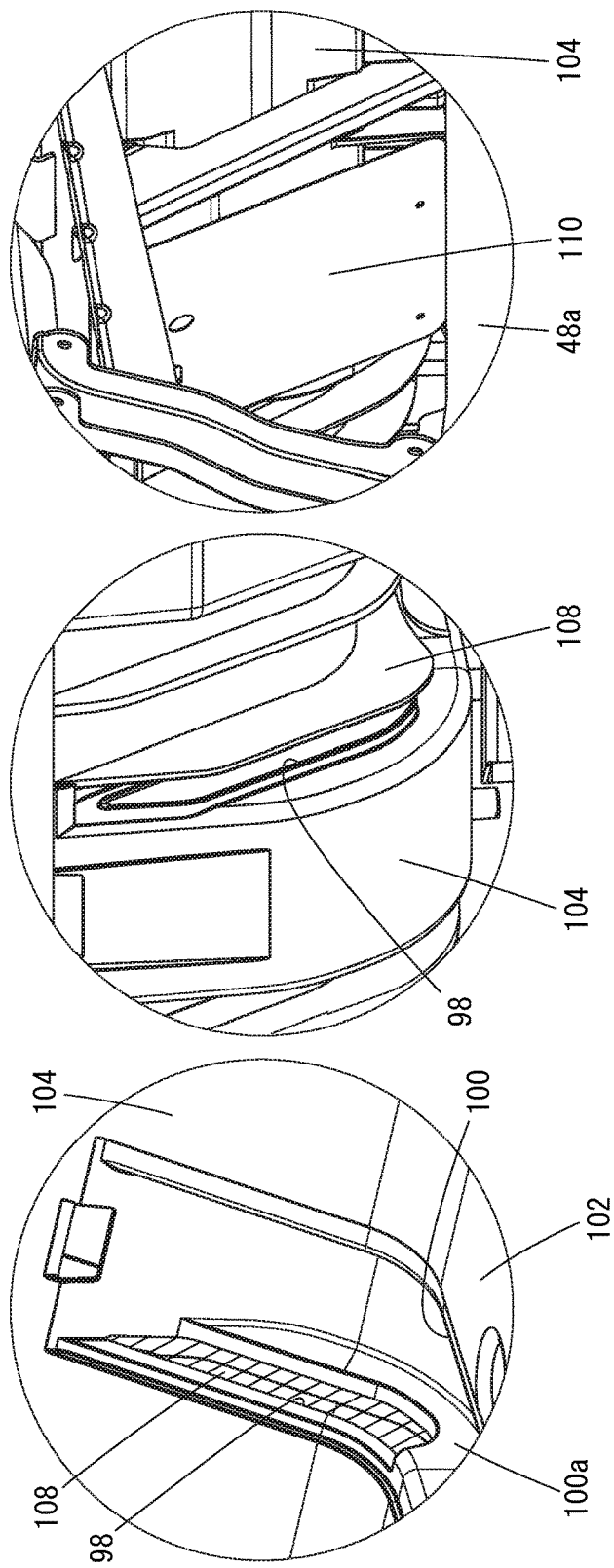
FIG. 10A is an enlarged view showing an opening.
FIG. 10B is an enlarged view showing a plate-shaped member.
FIG. 10C is an enlarged view showing a cover.
Figure 11:
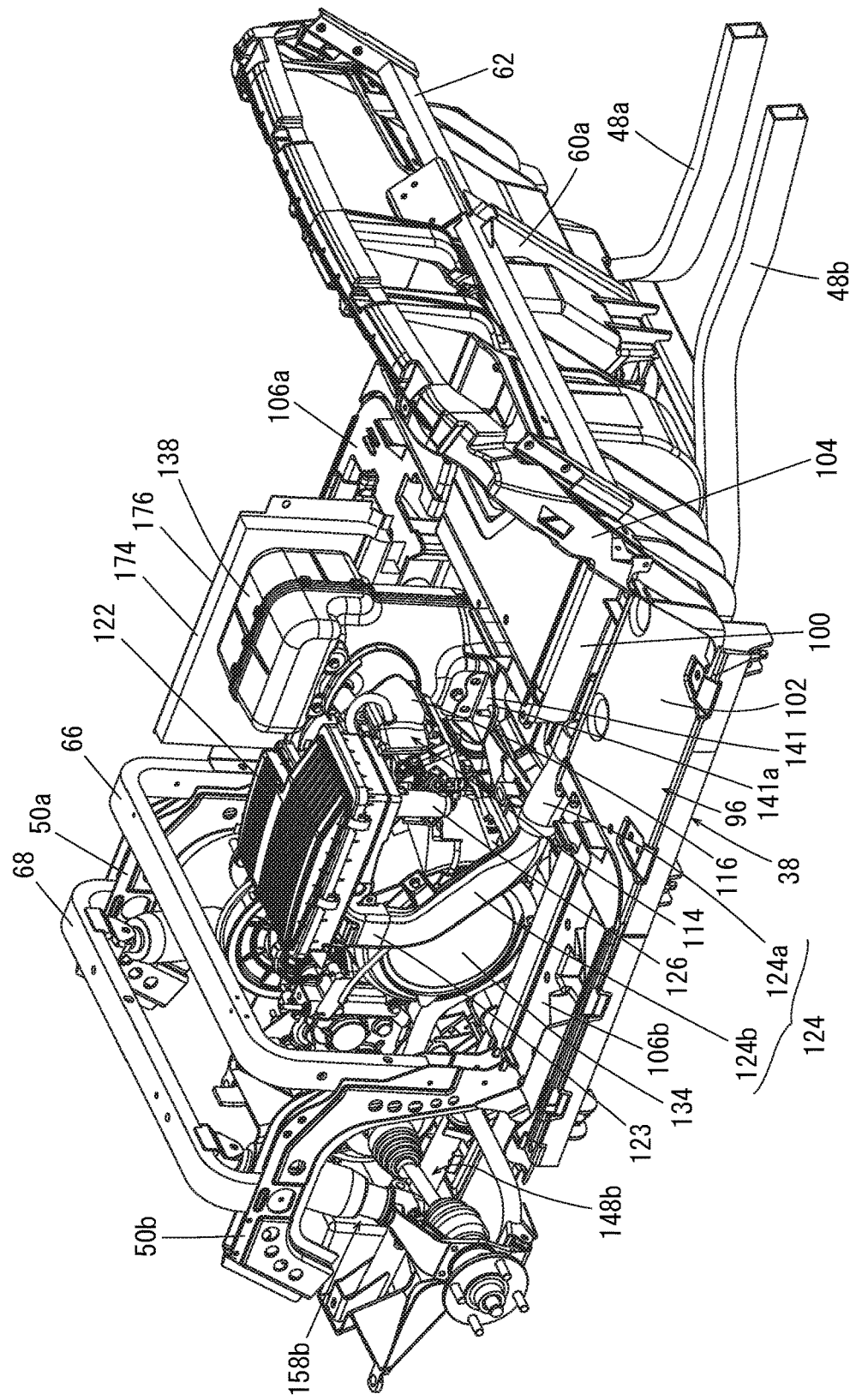
FIG. 11 is a front perspective view showing a primary portion of the golf car.

Referring to FIG. 8 and FIG. 9, the floor panel 38 is provided on the front frames 48a, 48b and the cross member 62 of the frame 16. The floor panel 38 is provided between the pair of front wheels 12a, 12b and the pair of rear wheels 14a, 14b. The floor panel 38 includes a panel main body 96, an opening 98, and a groove 100. The panel main body 96 includes a first panel 102 extending horizontally or substantially horizontally in the fore-aft direction between the front wheels 12a, 12b and the rear wheels 14a, 14b; a second panel 104 provided behind the front wheels 12a, 12b and extending upward from a front end region of the first panel 102; and third panels 106a, 106b extending rearward from left and right rear end regions of the first panel 102. The first panel 102 is located ahead of the engine room S; the third panel 106a is located on the left side of the engine room S; and the third panel 106b is located on the right side of the engine room S. Preferably, the second panel 104 rises obliquely forward from the front end region of the first panel 102. The opening 98 is located at a front region of the panel main body 96, i.e., in the second panel 104 (see FIG. 10A). FIG. 10A shows the opening 98 with hatching. The groove 100 communicates with the opening 98 in order to supply external air which is introduced from the opening 98 into a shroud 132 (which will be described below) and into the engine 114, is located on an upper surface of the panel main body 96, and extends in a fore-aft direction of the panel main body 96. The groove 100 is continuous from the second panel 104 to the first panel 102, provides communication between the opening 98 and the engine room S, and is able to introduce a running wind from ahead of the golf car 10 to the engine room S. Therefore, it is possible to cool the inside of the engine room S with the running wind from the opening 98 via the groove 100. Further, the groove 100 is preferably located on a side closer to a passenger's seat (the other side of the driver's seat) than the center, in the vehicle width direction. In the present preferred embodiment, the groove 100 is located slightly to the right of the center in the vehicle width direction. The opening 98 is located in a side surface 100*a* of the groove 100. Referring to FIGS. 10A and 10B, a plate-shaped member 108, which protrudes forward from a reverse surface (front surface) of the second panel 104, is provided on a side of the opening 98. Also, referring to FIG. 10C, a rectangular plate-shaped cover 110, which is supported by the frame 16, is provided ahead of the opening 98. Further, the groove 100 is covered by a lid 112 (see FIG. 8). The lid 112 is defined by a strip-shaped and plate-shaped member having a longitudinal shape of the groove 100.

Referring to FIG. 11 through FIG. 17, inside the engine room S, the engine bracket 84 supports the engine 114. The engine 114 is preferably an air-cooled engine including a single cylinder, for example. The engine 114 includes a fuel injector 115 which injects fuel into an air intake tube 126. The engine 114 is located behind the first panel 102 of the floor panel 38, and includes a cylinder head 116, a cylinder body 118, and a crank case 120. The engine 114 is preferably tilted forward. An air cleaner 122 is provided above the engine 114. The air cleaner 122 is joined to an air intake duct 124 via a joint 123. The air intake duct 124 is located on the right side of the air cleaner 122, and includes a cylindrical front duct 124*a* and a noise-reducing rear duct 124*b* having a flattened shape. A rear end portion of the front duct 124*a* and a front end portion of the rear duct 124*b* are joined to each other. In order to introduce the external air from the groove 100, the front duct 124*a* faces the groove 100 from the engine room S, and a rear end portion of the rear duct 124*b* is joined to the joint 123. Thus, the air intake duct 124 and the air cleaner 122 communicate with each other. As indicated by Arrow X in FIG. 16, the external air, which is introduced from ahead and comes through the opening 98 and into the groove 100, is then introduced into the air cleaner 122 from the groove 100 via the air intake duct 124. Then, after being cleaned by the air cleaner 122, the air is supplied, via the air intake tube 126, into the engine 114. As described above, the air cleaner 122 is provided between the air intake duct 124 and the engine 114. Inside the engine room S, a muffler 128 is provided adjacent to a side (on the left side in the present preferred embodiment) of the engine 114. The engine 114 and the muffler 128 are joined to each other via an exhaust pipe 130. Exhaust gas from the engine 114 is supplied to the muffler 128 via the exhaust pipe 130.

Figure 20:
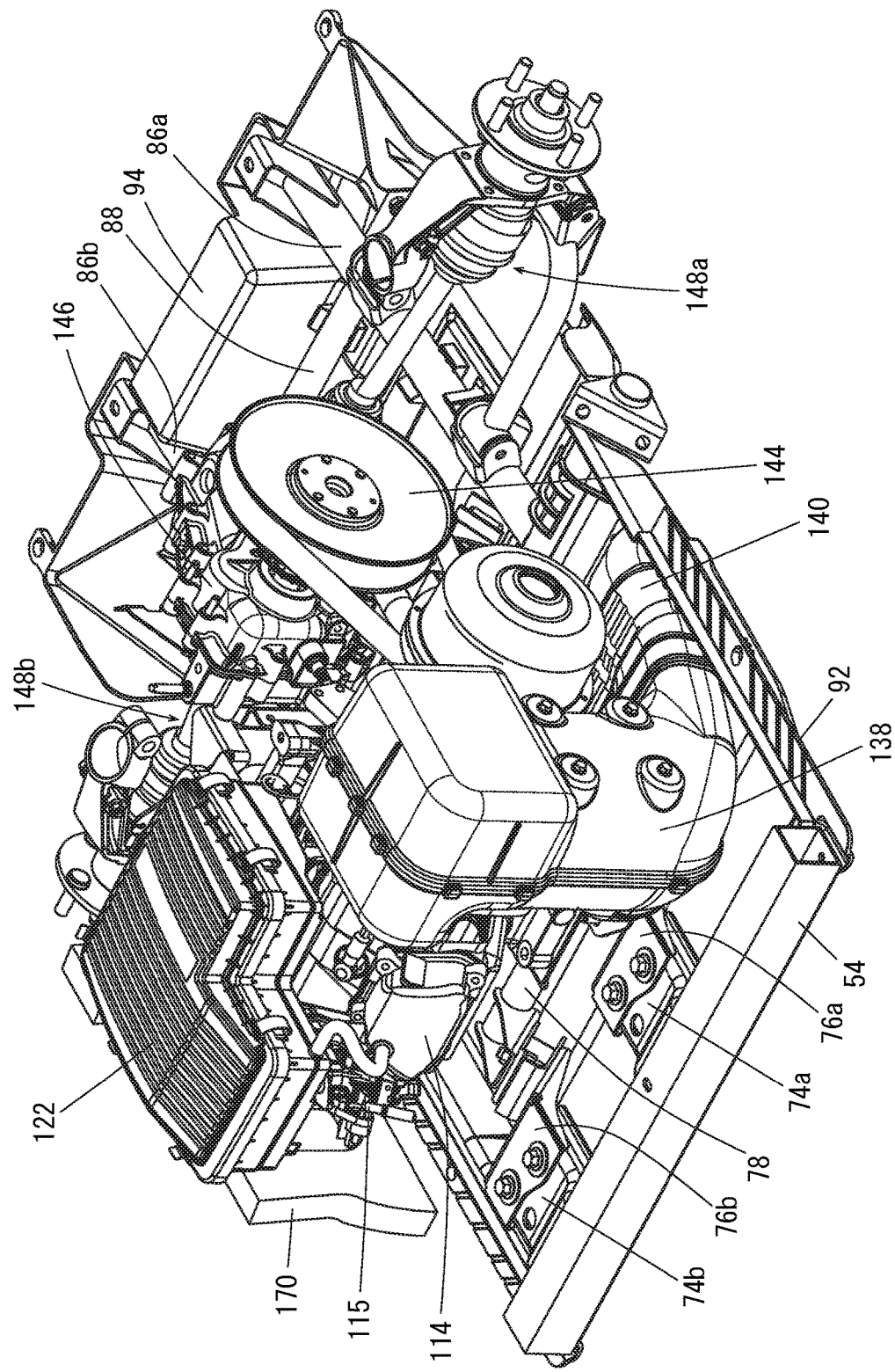
FIG. 20 is a front perspective view showing the engine, the muffler cover, and their surroundings.
Figure 21:
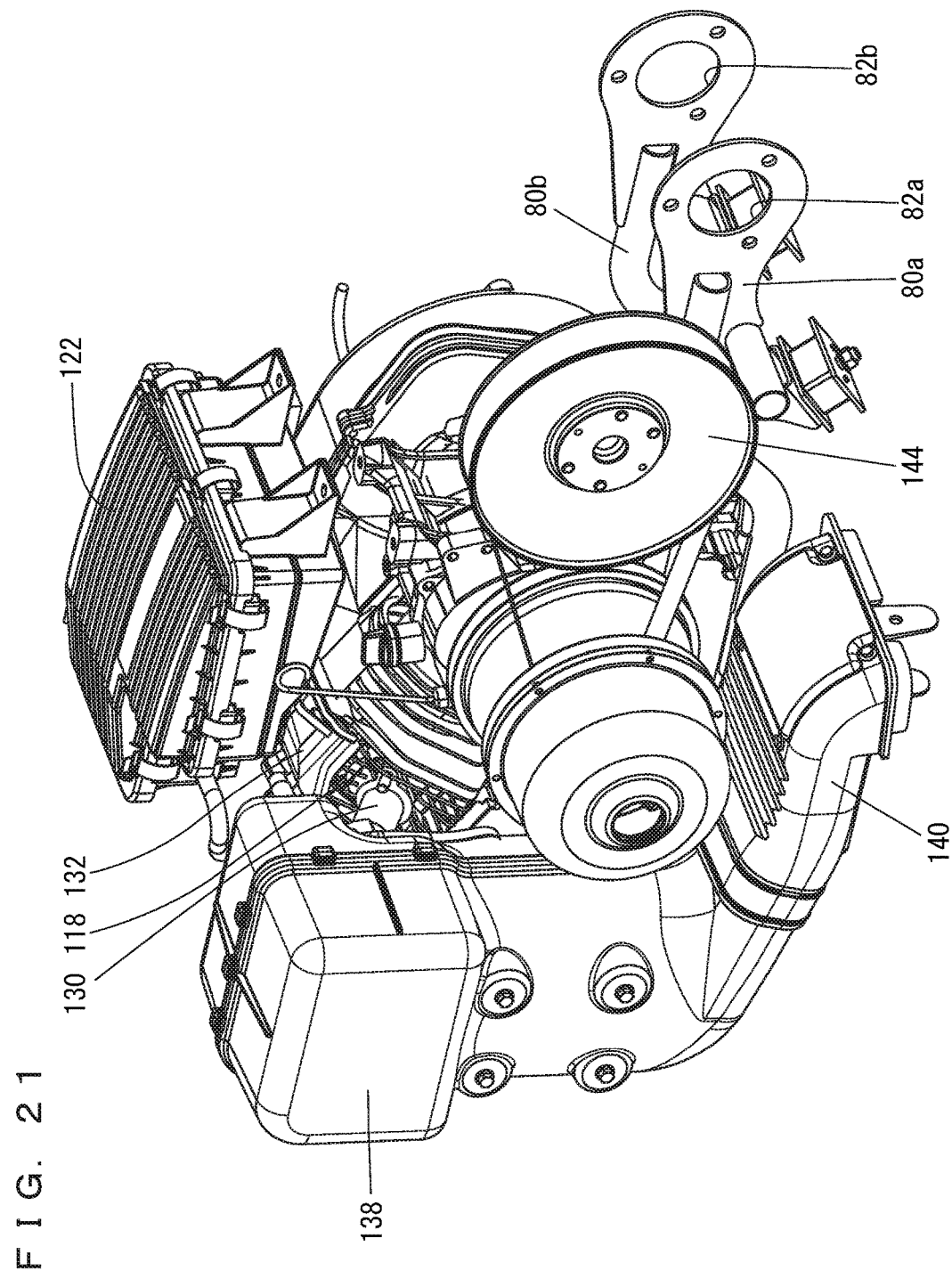
FIG. 21 is a rear perspective view showing the engine, the muffler cover, and their surroundings.

The cylinder body 118 of the engine 114 is covered by the shroud 132, with an air-flowable gap between the cylinder body 118 and the shroud 132. A fan case 134 is provided on a side surface (on the right side surface in the present preferred embodiment) of the engine 114. The shroud 132 and the fan case 134 are connected to each other. Inside the fan case 134, there is provided a fan 136 that supplies the external air from the groove 100 into the shroud 132 (between the shroud 132 and the engine 114). The fan 136 is preferably connected to a crank shaft 142 (see FIG. 18) and driven thereby. Also, the muffler 128 is covered by a muffler cover 138 so that an air-flowable gap is provided between the muffler 128 and the muffler cover 138. The muffler cover 138 is preferably made of a resin, for example, and is provided with an insulation member on its inner surface, for example, and has a substantially rectangular tubular upper portion and a substantially cylindrical lower portion. The shroud 132 and the muffler cover 138 communicate with each other via a duct 139 which covers the exhaust pipe 130. It should be noted here that FIG. 11, FIG. 12, FIG. 20, and FIG. 21 do not show the duct 139. An exhaust duct 140 is connected to an exit end portion of the muffler cover 138. The exhaust duct 140 includes a rear end portion exposed to the outside via an opening 92*a* of the front cover 92 (see FIG. 7 and FIG. 20). The muffler cover 138 is supported by the support frame 79 (see FIG. 4 and FIG. 11), as the projection 79*a* of the support frame 79 is inserted through a hole 141*a* of a bracket 141 attached on a side surface of the muffler cover 138. As indicated by Arrow Y in FIG. 17 and FIG. 18, the external air which is introduced into the shroud 132 by the fan 136 flows between the shroud 132 and the engine 114 (the cylinder body 118), into the muffler cover 138 (between the muffler cover 138 and the muffler 128), and defines a cooling wind to cool the engine 114 and the muffler 128. Then, the air inside the muffler cover 138 flows through the exhaust duct 140 and is discharged from the opening 92*a* of the front cover 92 to the outside below the engine room S.

Referring also to FIG. 18 through FIG. 21, an output from the crank shaft 142 of the engine 114 is transmitted via the CVT 144 to the transmission 146. The CVT 144 is located behind the muffler 128, whereas the transmission 146 is located behind the engine 114 between the pair of rear wheels 14*a*, 14*b*.

Referring also to FIG. 4, the transmission 146 is joined to a pair of rotation transmission portions 148*a*, 148*b*. The rotation transmission portion 148*a* extends to the left of the transmission 146, and includes a constant-velocity joint 150*a*, a drive shaft 152*a*, a constant-velocity joint 154*a*, and an axle 156*a*. The transmission 146 includes an output shaft (not illustrated) connected to the drive shaft 152*a* by the constant-velocity joint 150*a*, whereas the drive shaft 152*a* and the axle 156*a* are connected to each other by the constant-velocity joint 154*a*. The rotation transmission portion 148*b* extends to the right of the transmission 146, and includes a constant-velocity joint 150*b*, a drive shaft 152*b*, a constant-velocity joint 154*b*, and an axle 156*b*. The transmission 146 includes an output shaft connected to the drive shaft 152*b* by the constant-velocity joint 150*b*, whereas the drive shaft 152*b* and the axle 156*b* are connected to each other by the constant-velocity joint 154*b*. The axle 156*a* supports the rear wheel 14*a*, whereas the axle 156*b* supports the rear wheel 14*b*. It should be noted here that the through-hole 82*a* at the rear end portion of the support frame 80*a* is penetrated by the output shaft of the transmission 146 between the transmission 146 and the constant-velocity joint 150*a*, whereas the through-hole 82*b* at the rear end portion of the support frame 80*b* is penetrated by the output shaft of the transmission 146 between the transmission 146 and the constant-velocity joint 150*b* (see FIG. 13).

Also, the pair of rear wheels 14*a*, 14*b* are suspended by a pair of suspensions 158*a*, 158*b*. In the present preferred embodiment, the pair of suspensions 158*a*, 158*b* are preferably independent suspension systems. The pair of suspensions 158*a*, 158*b* include knuckles 160*a*, 160*b*, arms 162*a*, 162*b*, and shock absorbers 164*a*, 164*b* respectively. The knuckle 160*a* rotatably supports the axle 156*a*. The arm 162*a* connects a lower portion of the knuckle 160*a* and the frame 86*a* to each other. The shock absorber 164*a* includes a lower end portion and an upper end portion respectively joined to an upper end portion of the knuckle 160*a* and to the connection frame 68. Likewise, the knuckle 160*b* rotatably supports the axle 156*b*. The arm 162*b* connects a lower portion of the knuckle 160*b* and the frame 86*b* to each other. The shock absorber 164*b* includes a lower end portion and an upper end portion respectively joined to an upper end portion of the knuckle 160*b* and to the connection frame 68.

Figure 12:
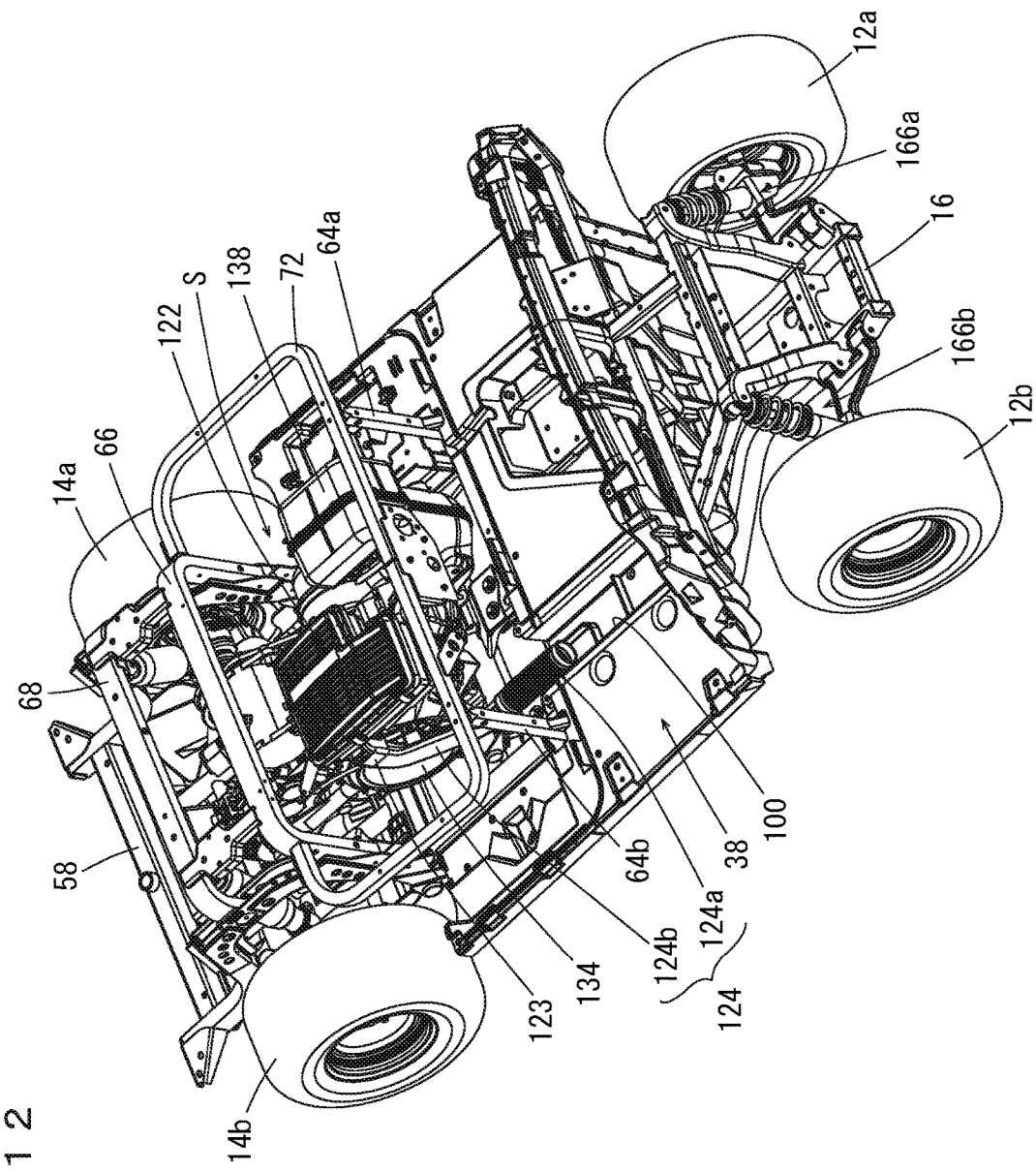
FIG. 12 is a front perspective view showing a primary portion of the golf car.
Figure 13:
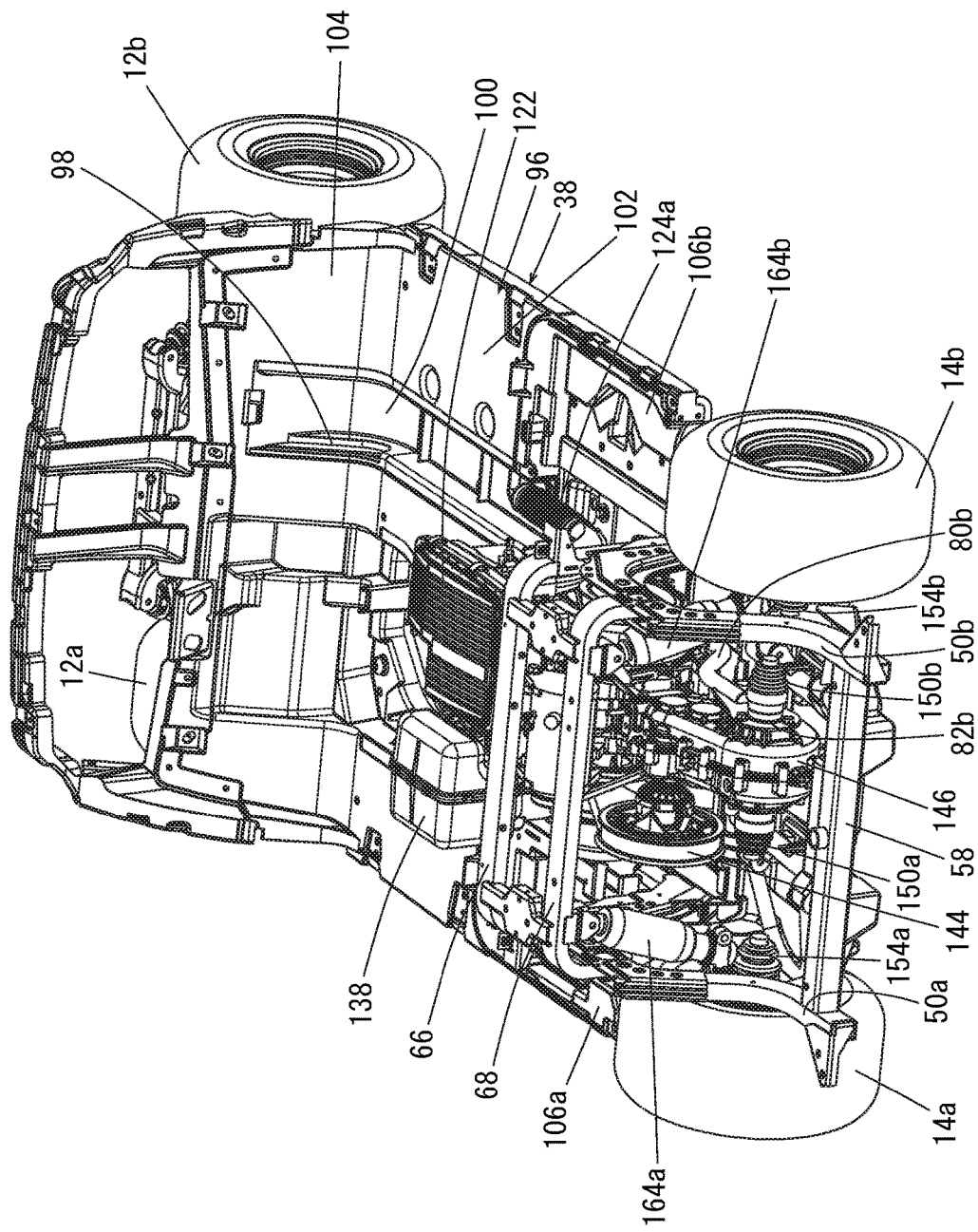
FIG. 13 is a rear perspective view showing a primary portion of the golf car.

Referring to FIG. 12, the pair of front wheels 12a, 12b are suspended by a pair of suspensions 166a, 166b attached to the front region of the frame 16. In the present preferred embodiment, the pair of suspensions 166a, 166b are preferably independent suspension systems.

Figure 14:
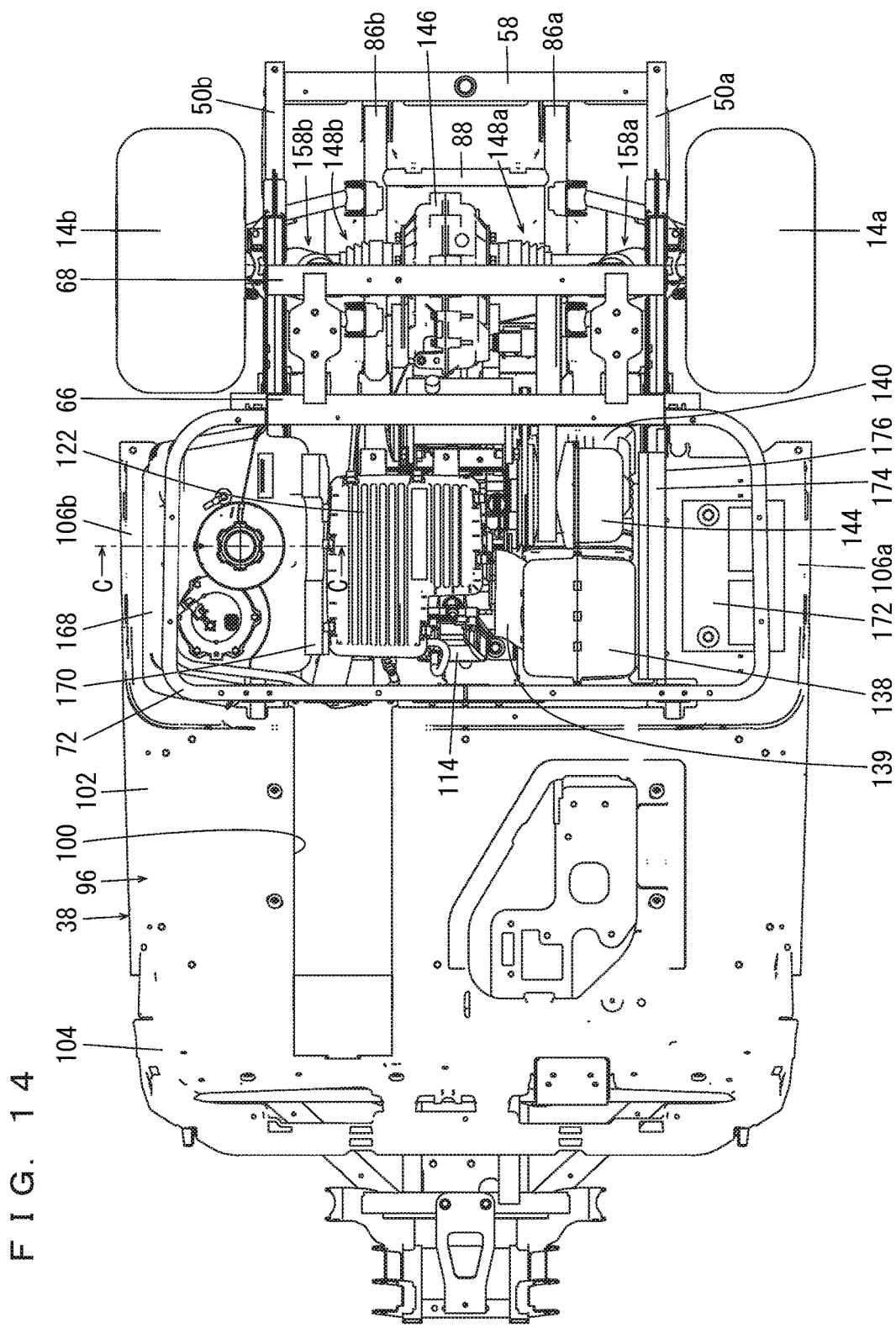
FIG. 14 is a plan view showing a primary portion of the golf car.
Figure 15:
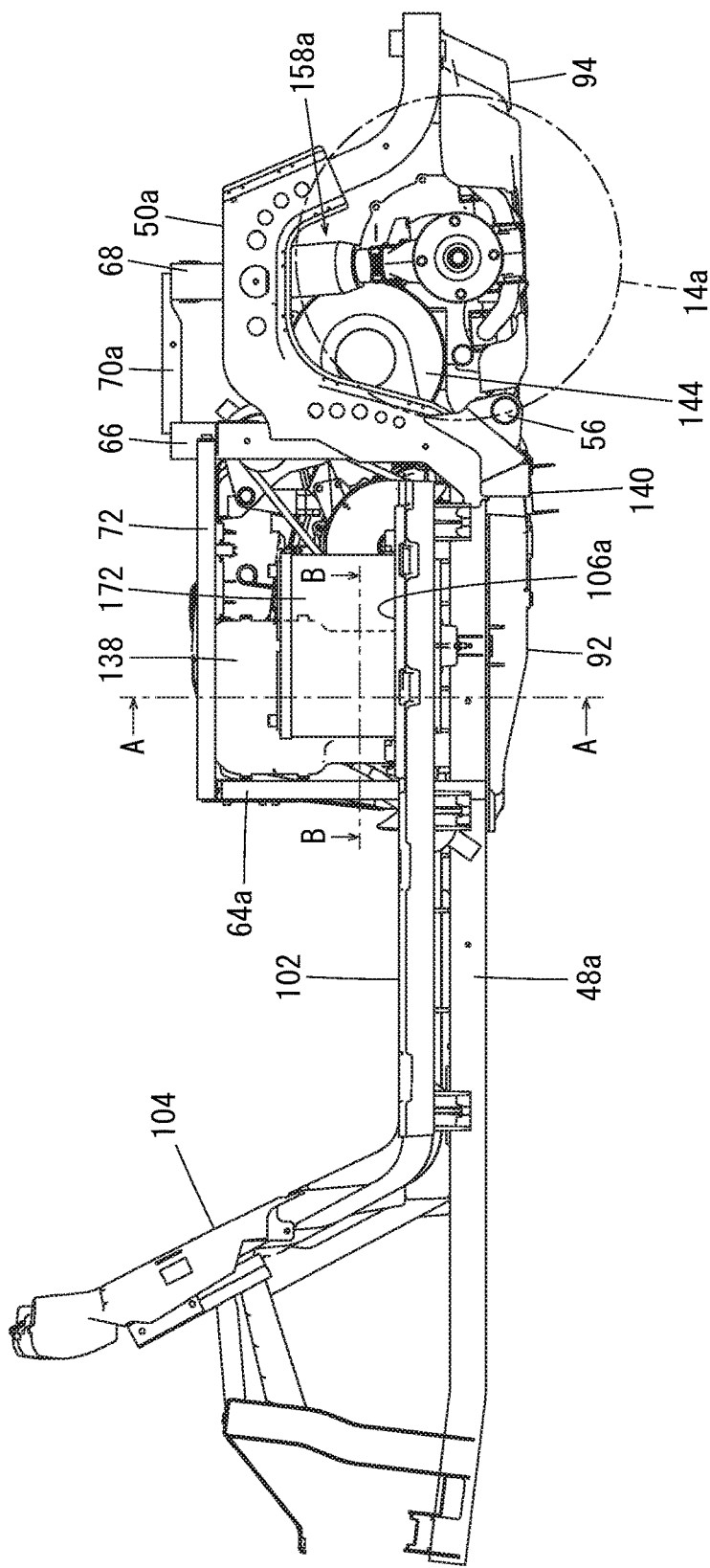
Figure 16:
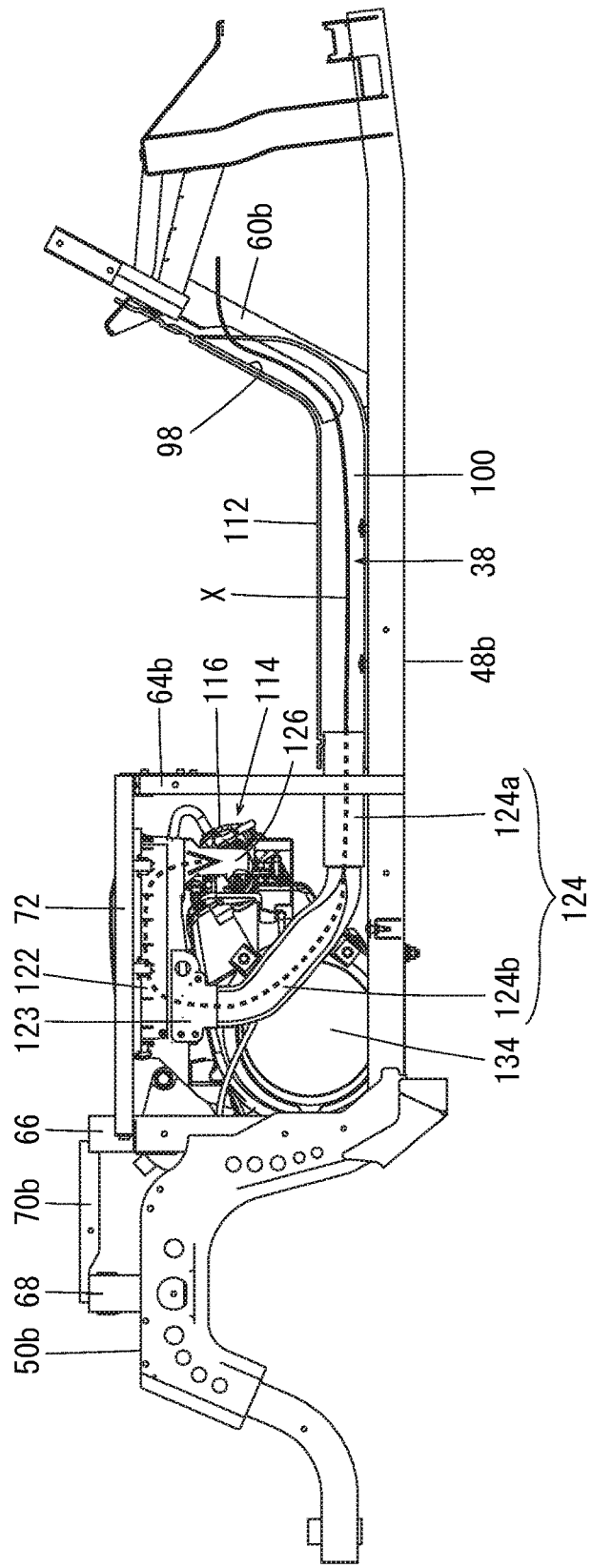
FIG. 16 is a side view (taken from right) showing the frame, a groove, and so on, in a state where a portion of the floor panel on a side to the right of the groove is removed.
Figure 17:
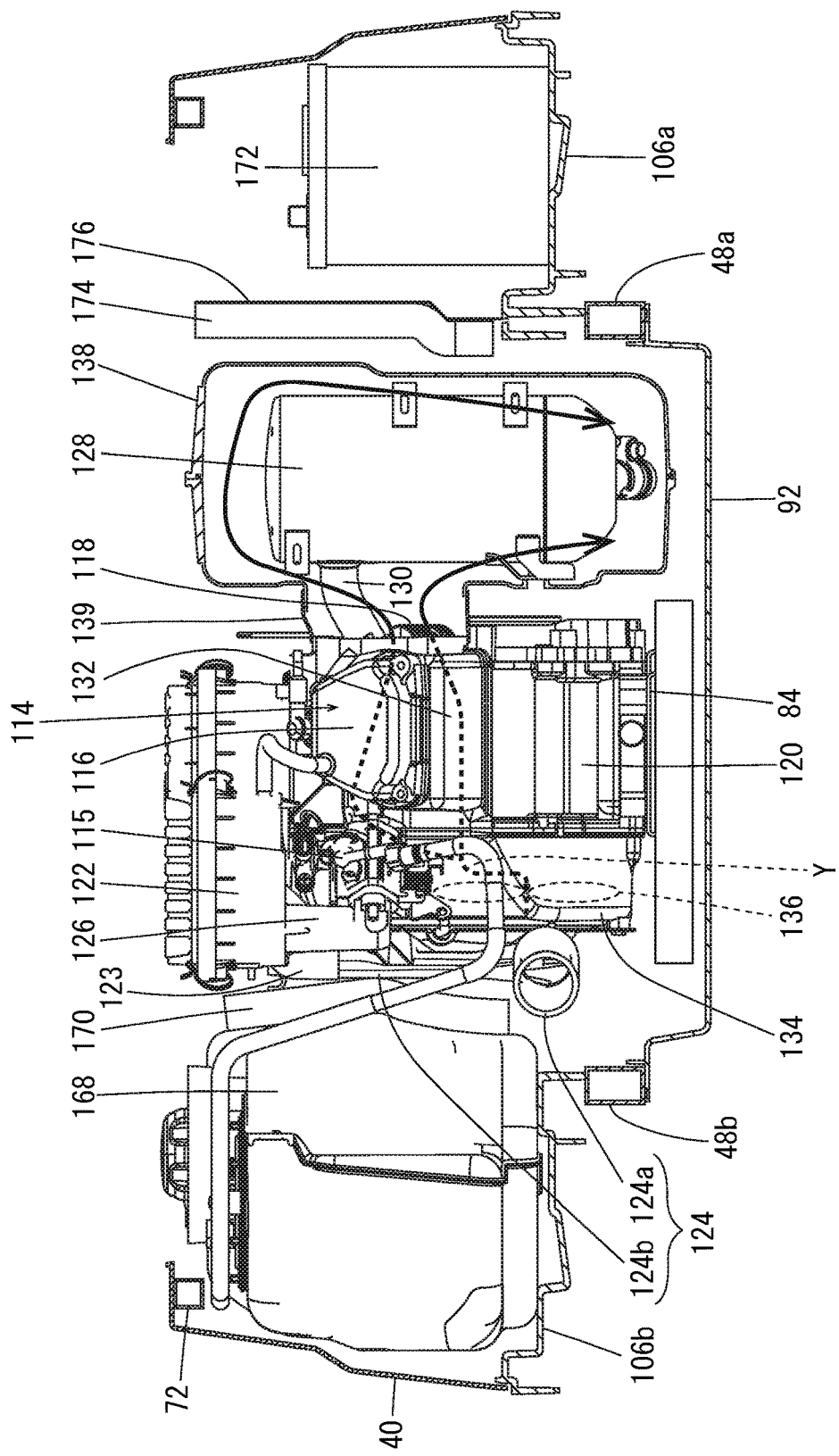
FIG. 17 is a front view with a partial section taken along a line A-A in FIG. 15 to show an engine, a muffler, and their surroundings.
Figure 18:
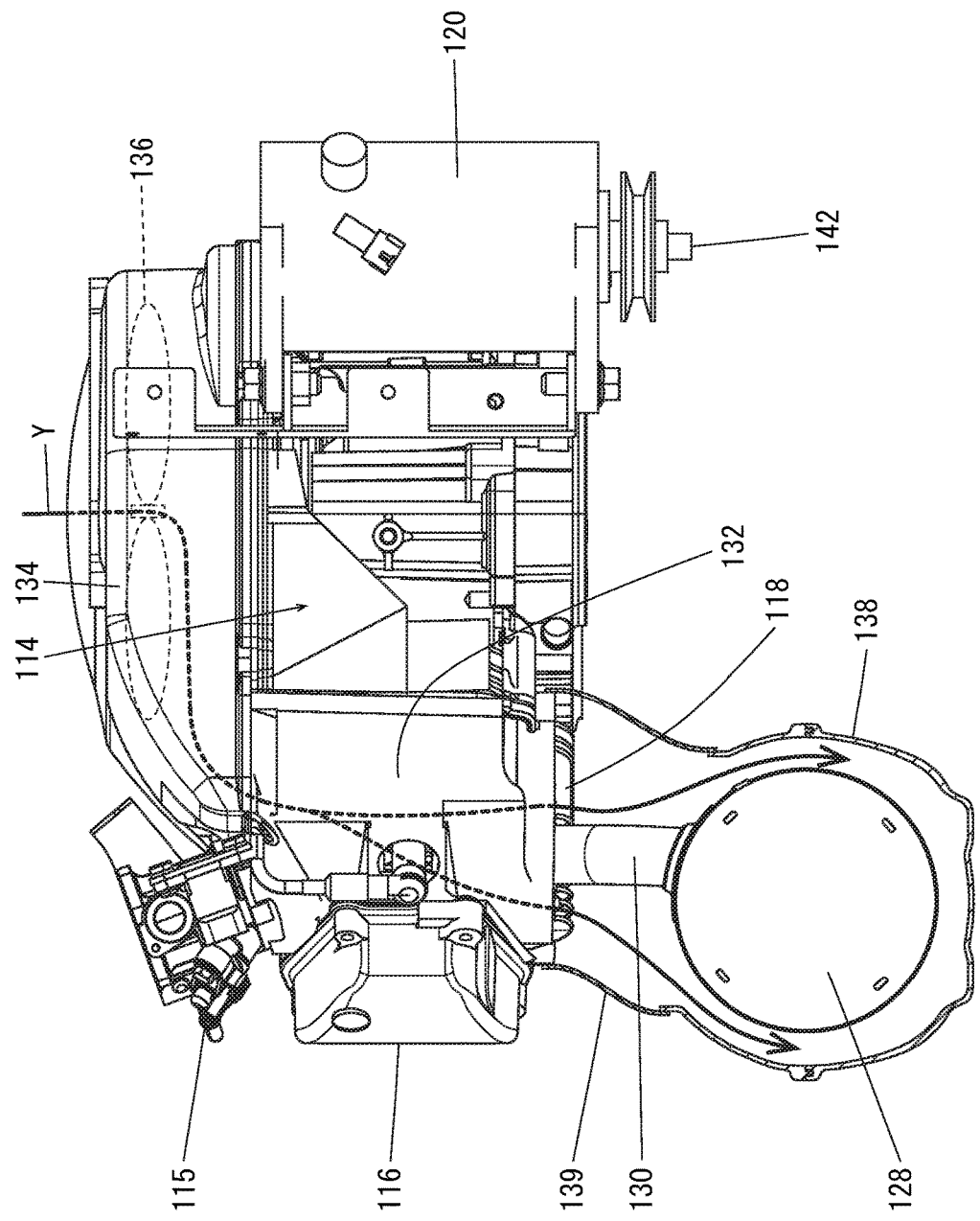
FIG. 18 is a plan view with a partial section taken along a line B-B in FIG. 15 to show the engine, the muffler, and their surroundings.
Figure 19:
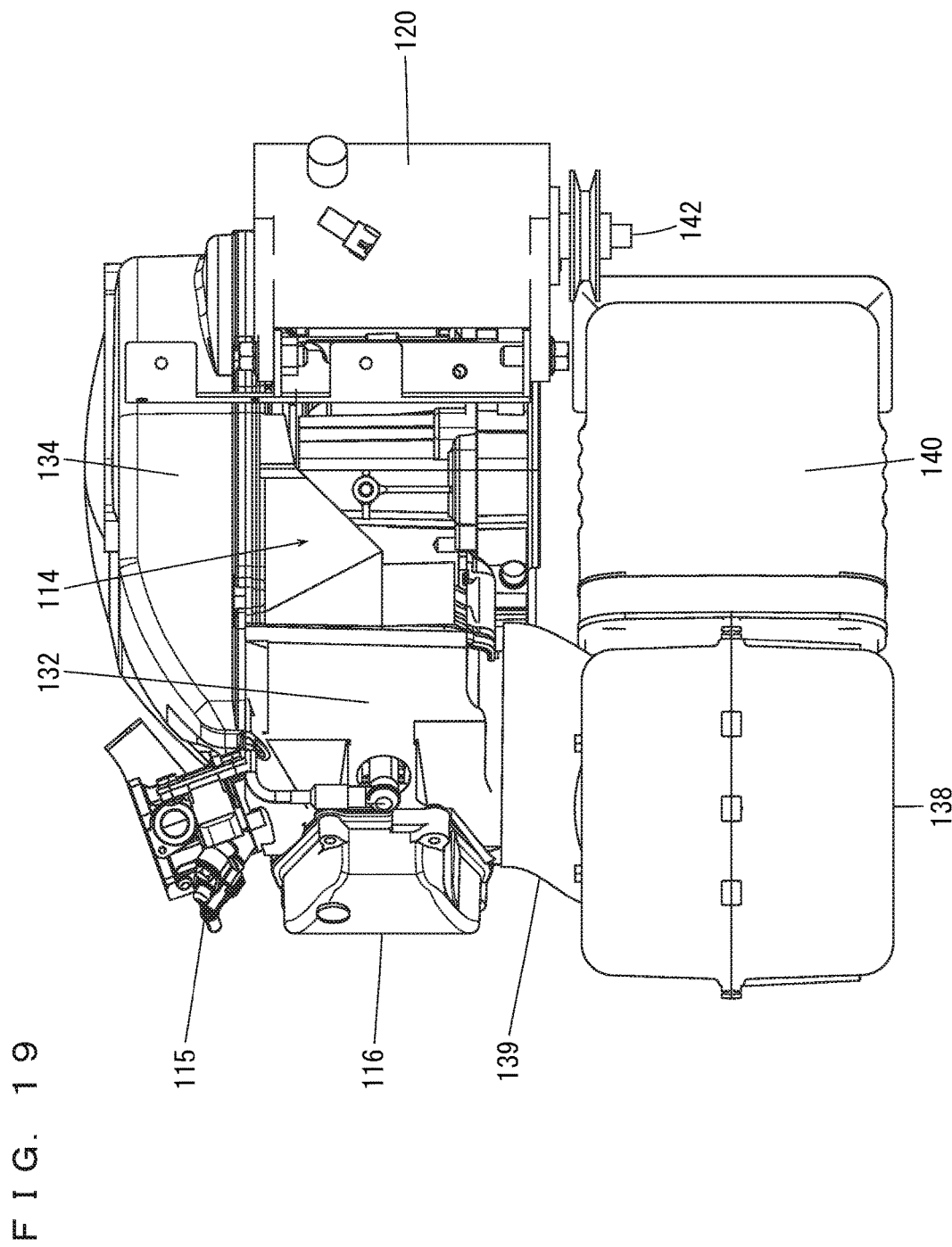
FIG. 19 is a plan view showing the engine, a muffler cover, and their surroundings.

Referring to FIG. 14 and FIG. 17, the fuel tank 168 is located on the right side of the engine 114 and on the third panel 106b of the floor panel 38. Between the engine 114 and the fuel tank 168, a sound absorbing member 170 is provided and attached to a side surface of the fuel tank 168. Also, a battery 172 is located on the left of the muffler cover 138 and on the third panel 106a of the floor panel 38. Between the muffler cover 138 and the battery 172, a two-ply structure made of a sound absorbing member 174 and the heat insulation board 176 is provided. It is possible with the sound absorbing members 170 and 174 to absorb noise from the engine room S, whereas it is possible with the heat insulation board 176 to reduce heat conduction from the engine room S to the battery 172.

Figure 22B:
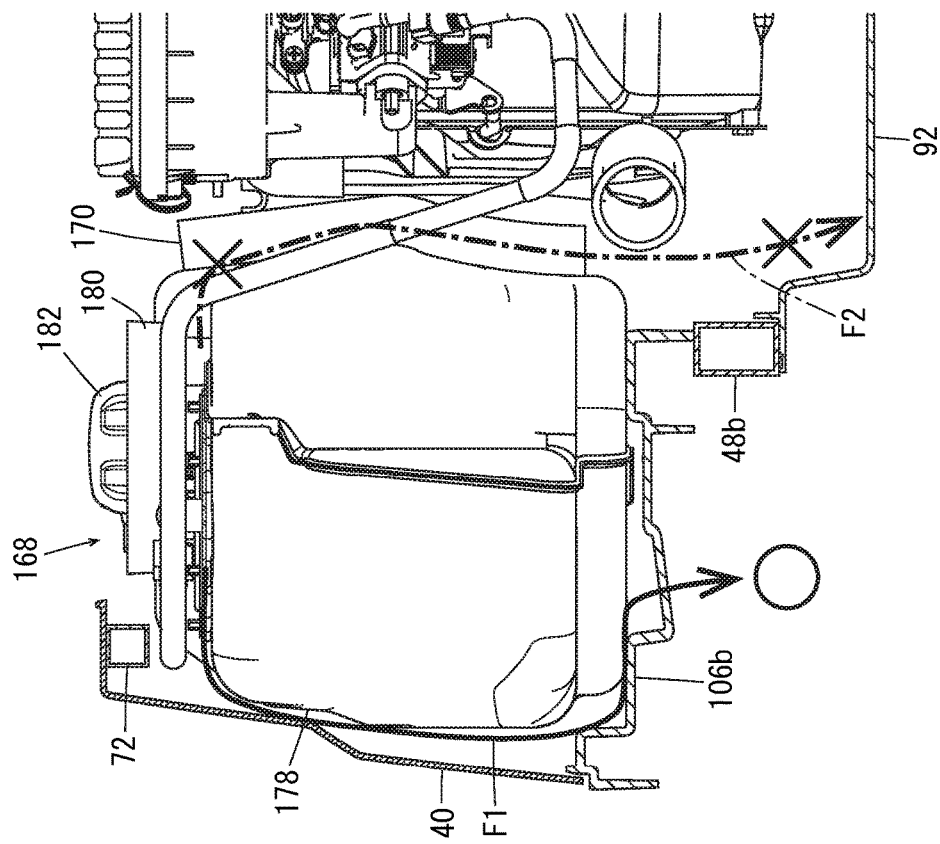
FIG. 22B is a front view with a partial section which shows the fuel tank and its surroundings.
Figure 22A:
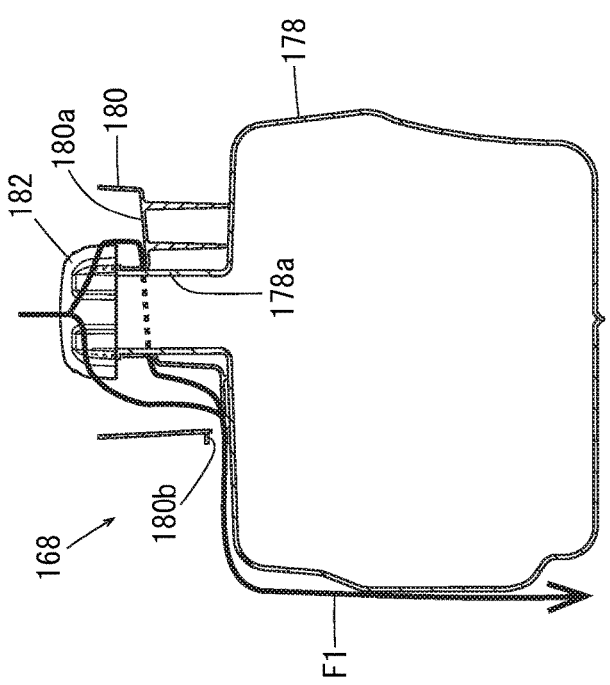
FIG. 22A is a front view with a partial section taken along a line C-C in FIG. 14 to show a fuel tank.

Referring to FIGS. 22A and 22B, the fuel tank 168 includes a tank main body 178; a fuel catch 180 which is fitted around a neck portion 178a of the tank main body 178 to surround the neck portion 178a; and a cap 182 which is attached to an upper end region of the neck portion 178a. The fuel catch 180 includes a bottom surface 180a which is slanted to extend outwardly and downwardly in the vehicle width direction, and an opening 180b which is located on an outer side in the vehicle width direction.

With the fuel tank 168 described above, it is possible to catch spilled fuel with the fuel catch 180 at a time of fueling. The fuel caught in the fuel catch 180 comes out of the opening 180b, flows along an outer side surface of the tank main body 178, then along the third panel 106b, and then is discharged outside. Therefore, it is possible with this structure to prevent spilled fuel from soaking into the sound absorbing member 170 or remaining on the undercover 90 (particularly on the front cover 92). In other words, spilled fuel flows as indicated by Arrow F1 in FIGS. 22A and 22B, but does not flow as indicated by Arrow F2 in FIG. 22B. It should be noted here that the fuel catch 180 may be provided with a discharge pipe to discharge the fuel from the fuel catch 180 through the discharge pipe to the outside.

According to preferred embodiments of the golf car 10 described above, external air is introduced from the opening 98 of the panel main body 96, flows through the groove 100 which defines an external air introducing path, and then is supplied to the inside of the shroud 132. With this structure, the opening 98 and the groove 100 are located in the panel main body 96 of the floor panel 38; in other words, the floor panel 38 itself includes an external air introducing path. Therefore, there is no need to provide a separate external air introducing path with an individual member separate from the floor panel 38. Also, the groove 100 is defined by providing the panel main body 96 with a downward recess in its upper surface, i.e., so that the recess opens in the upper surface, and not in the lower surface. Since the floor panel 38 itself protects members which are located thereabove, there is no need to provide protection members to protect the external air introducing path (the groove 100) below the groove 100. Therefore, it is possible to introduce external air with a reduced number of parts.

By providing the opening 98 in the second panel 104 which extends upward, it is possible to efficiently introduce running wind as the external air from ahead of the golf car 10 into the groove 100.

By covering the groove 100 with the lid 112, it is possible to introduce the external air which flows through the groove 100 more reliably toward the rear, thus supplying the air easily into the shroud 132.

Since the opening 98 is located in the side surface 100a of the groove 100, it is possible to reduce the entry of mud, sand, stones and other foreign matter into the opening 98 and then into the groove 100 when they fly from ahead of the golf car 10 into the front surface of the floor panel 38.

By providing the cover 110 ahead of the opening 98, it is possible to further reduce the entry of mud, sand, stones and other foreign matter into the opening 98 and then into the groove 100 when they fly from ahead of the golf car 10 into the front surface of the floor panel 38.

The external air from the groove 100 is supplied into the shroud 132 efficiently and smoothly by the fan 136.

By positioning the muffler 128 next to the engine 114, it is possible to shorten the length of the exhaust pipe 130 which allows exhaust gas to move from the engine 114 to the muffler 128. Further, by connecting the muffler cover 138, which covers the muffler 128, to the shroud 132, the external air is able to also flow through the groove 100 to the inside of the muffler cover 138. Therefore, it is possible to cool not only the engine 114 but also the muffler 128.

Since the external air which flows through the groove 100 is supplied not only into the shroud 132 but also into the engine 114, there is no need to separately provide an air intake path to supply air into the engine 114.

By positioning the air intake duct 124 to face the groove 100, external air from the groove 100 is introduced to the air cleaner 122 efficiently via the air intake duct 124, and after being cleaned by the air cleaner 122, the external air is supplied smoothly into the engine 114.

In the preferred embodiments described above, description was made of a golf car. However, the present invention is not limited to this. Preferred embodiments of the present invention are applicable to any other vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a front wheel;
   a rear wheel provided at a more rearward position than the front wheel;
   a floor panel provided between the front wheel and the rear wheel;
   an engine including a cylinder body and located rearward of the floor panel; and
   a shroud covering the cylinder body; wherein
   the floor panel includes:
      a panel main body;
      an opening provided at a front portion of the panel main body; and
      a groove provided in an upper surface of the panel main body to communicate with the opening and extend in a fore-aft direction of the panel main body to supply external air from the opening into the shroud.

2. The vehicle according to claim 1, wherein the panel main body includes a first panel extending in the fore-aft direction between the front wheel and the rear wheel, and a second panel located behind the front wheel and extending upward from a front end region of the first panel;

the opening is located in the second panel; and the groove communicates with the opening and is continuous from the second panel to the first panel.

3. The vehicle according to claim 1, further comprising a lid that covers the groove.

4. The vehicle according to claim 1, wherein the groove includes a side surface, and the opening is located in the side surface.

5. The vehicle according to claim 1, further comprising a cover located forward of the opening.

6. The vehicle according to claim 1, further comprising a fan that supplies the external air from the groove into the shroud.

7. The vehicle according to claim 1, further comprising:

a muffler that receives exhaust gas from the engine; and a muffler cover that covers the muffler and communicates with the shroud; wherein the muffler is located adjacent to the engine.

8. The vehicle according to claim 1, wherein the groove also supplies the external air into the engine.

9. The vehicle according to claim 8, further comprising:

an air intake duct that faces the groove and introduces the external air from the groove; and an air cleaner provided between the air intake duct and the engine to clean the external air from the air intake duct before the external air is supplied into the engine.

\* \* \* \* \*